US008924278B2

(12) United States Patent
Farrell et al.

(10) Patent No.: US 8,924,278 B2
(45) Date of Patent: Dec. 30, 2014

(54) SYSTEM AND METHOD FOR CONTROLLING MARKETS DURING A STOP LOSS TRIGGER

(75) Inventors: James Farrell, Carol Stream, IL (US); James Krause, Palatine, IL (US); Mazen Chadid, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 2946 days.

(21) Appl. No.: 10/713,126

(22) Filed: Nov. 14, 2003

(65) Prior Publication Data

US 2005/0108141 A1 May 19, 2005

Related U.S. Application Data

(60) Provisional application No. 60/490,145, filed on Jul. 25, 2003.

(51) Int. Cl.
*G06Q 40/00* (2012.01)
*G06Q 40/04* (2012.01)

(52) U.S. Cl.
CPC .................................. *G06Q 40/04* (2013.01)
USPC ........................................................ 705/37

(58) Field of Classification Search
USPC .............................................. 705/26, 35–37
See application file for complete search history.

(56) References Cited

U.S. PATENT DOCUMENTS

| 4,903,201 | A | | 2/1990 | Wagner | |
|---|---|---|---|---|---|
| 4,980,826 | A | | 12/1990 | Wagner | |
| 6,016,483 | A | * | 1/2000 | Rickard et al. | 705/36 R |
| 6,405,180 | B2 | * | 6/2002 | Tilfors et al. | 705/36 R |
| 6,418,419 | B1 | * | 7/2002 | Nieboer et al. | 705/37 |
| 7,082,410 | B1 | * | 7/2006 | Anaya et al. | 705/37 |
| 7,099,839 | B2 | | 8/2006 | Madoff et al. | |
| 7,356,499 | B1 | * | 4/2008 | Amburn | 705/37 |
| 7,430,533 | B1 | * | 9/2008 | Cushing | 705/37 |
| 2001/0042036 | A1 | * | 11/2001 | Sanders | 705/36 |
| 2001/0049651 | A1 | * | 12/2001 | Selleck | 705/37 |
| 2002/0019795 | A1 | * | 2/2002 | Madoff et al. | 705/37 |
| 2002/0073018 | A1 | * | 6/2002 | Mulinder et al. | 705/37 |
| 2002/0103742 | A1 | * | 8/2002 | Billings et al. | 705/37 |

(Continued)

FOREIGN PATENT DOCUMENTS

JP 2002-183446 6/2002

OTHER PUBLICATIONS

ASE.com "Exchange news 2001", Available at http://www.ase.com.jo/en/exchange-news-2001, Effective Apr. 15, 2001.*

(Continued)

*Primary Examiner* — Ryan D Donlon
(74) *Attorney, Agent, or Firm* — Lempia Summerfield Katz LLC

(57) ABSTRACT

A system and method for mitigating effects of a market spike caused by triggering and election of a conditional order in an automated matching system. The system includes evaluation logic which monitors conditional orders submitted to a trading engine compares a price of an order to a first predefined price range ("first range") and delay logic which delays matching of the submitted orders when the price thereof lie outside of the first range. Pricing logic derives an opening price for use by the trading engine. Timing logic measures a time interval to delay matching of the orders until the opening price is within a predefined price range up to a maximum delay time set by a control center.

10 Claims, 5 Drawing Sheets

(56) References Cited

U.S. PATENT DOCUMENTS

| | | | |
|---|---|---|---|
| 2002/0156718 | A1 | 10/2002 | Olsen et al. |
| 2003/0069830 | A1 | 4/2003 | Morano et al. |
| 2004/0210504 | A1* | 10/2004 | Rutman ........................... 705/37 |
| 2005/0049956 | A1* | 3/2005 | Ballman ......................... 705/37 |
| 2005/0075965 | A1* | 4/2005 | Cutler ............................ 705/37 |
| 2005/0075966 | A1* | 4/2005 | Duka .............................. 705/37 |
| 2005/0108141 | A1 | 5/2005 | Farrell et al. |
| 2005/0283423 | A1 | 12/2005 | Moser et al. |
| 2006/0167779 | A1 | 7/2006 | Turner |
| 2006/0173764 | A1* | 8/2006 | Costakis et al. ................ 705/35 |
| 2008/0015970 | A1 | 1/2008 | Brookfield et al. |
| 2010/0121759 | A1* | 5/2010 | Waelbroeck et al. ........... 705/37 |

OTHER PUBLICATIONS

Harris, et al., "Circuit Breakers and Program Trading Limits: What have we learned?", Available at: http://lharris.usc.edu/Acrobat/Circuit.PDF, Dec. 9, 1997.*
"User Manual of the Securities Trading System", Amman Stock Exchange, Availabe at: http://194.165.154.74/ar/printpdf/node/1606, Retrieved Oct. 11, 2012.*
"What is conditional order? definition and meaning", Available at: http://www.investorwords.com/7580/conditional_order.html, Retrieved Oct. 11, 2012.*
U.S. Appl. No. 60/431,913, filed Dec. 2002, Balabon, Sam.*
Hamao et al. "Securities trading in the absence of dealers: Trades and quotes on the Tokyo Stock Exchange" 1992, Center on Japanese Economy and Business, vol. 69.*
Lehmann et al., "Market Structure and Liquidity on the Tokyo Stock Exchange", Jan. 1996, University of Chicago Press, The Industrial Organization and Regulation of the Securities Industry, vol. 96-1, p. 275-316.*
Hamao et al., "Securities Trading in the Absence of Dealers: Trades and Quotes on the Tokyo Stock Exchange" 1995 Oxford University Press, The Review of Financial Studies, vol. 8, No. 3, pp. 849-878.*
Biais et al. "An Empirical Analysis of the Limit Order Book and the Order Flow in the Paris Bourse" 1995, The Journal of Finance, vol. 50, No. 5., pp. 1655-1689.*
Lehmann et al., "Trading and Liquidity on the Tokyo Stock Exchange: A Birds Eye View" 1994, Institute of Business and Economic Research, Finance Working Paper No. 234.*
Amihud et al., "Stock Market Microstructure and Return Volatility" 1990, Journal of Banking and Finance 14 p. 423-440.*
Corwin, "Order Flow and Liquidity around NYSE Trading Halts" 2000, The Journal of Finance, vol. LV, No. 4.*
"Self-Regulatory Organizations; Notice of Filing of Proposed Rule Change . . . Relating to the Establishment of Trade and Quote Halt Authority for the NASD's OTCBB Service" Jan. 18, 2000 Securities and Exchange Commission Release No. 34-42345; File No. SR-NASD-99-33.*
"Code of Federal Regulations," Commodity and Securities Exchanges, Apr. 1, 1983, Parts 1-239, pp. 1-322.
Teweles and Bradley, "The Stock Market," Fourth Edition, 1982, John Wiley & Sons, Inc., pp. 136-179.
Melamed, Leo, "Automation in the Futures Industry" Proceedings of a Conference Sponsored by Commodity Futures Trading Commission, Jun. 15, 1977, Washington, D.C., pp. 1-2 and 273-283.
Aitken and Berry, "Surveillance Literature . . . Market Surveillance at the Australian Stock Exchange: An Overview", 5$^{th}$ Draft, Jul. 1991, pp. 1-21.
Barish and Siff, "Operational Gaming Simulation With Application to a Stock Market," Management Science, Journal of the Institute of Management Sciences, vol. 15, No. 10, Jun. 1969, pp. B-530-B-541.
Garman, Mark B., "A Description of an Experimental Securities Exchange" University of California, Berkeley, Mar. 1975, revised Oct. 1975, pp. 1-17 and Appendix pp. 1-3.
"Automated Bonds System (ABS), User Manual", The New York Stock Exchange, Floor Operations Department, Feb. 27, 1976, 75 pages.

French and Roll, "Journal of Financial Economics the Arrival of Information and Reaction of Traders", Stock Return Variances Elsevier Science Publishers B.V. (North Holland), 1986, pp. 5-27.
Blume, Siegel and Rottenberg, Revolution on Wall Street, The Rise and Decline of the New York Stock Exchange, "Chapter 11: Technology and the Marketplace", W.W. Norton & Company, New York and London, 1993, pp. 192-214.
Letter to George A. Fitzsimmons, Securities and Exchange Commission, Apr. 30, 1976, pp. 1-4.
Williams, Arlington W., "Computerized Double-Auction Markets: Some Initial Experimental Results," The Journal of Business, The Graduate School of Business of the University of Chicago, vol., No. 3, Part 1, Jul. 1980, pp. 235-258.
Carrington, "Computer Linkups Letting Traders Start Up Securities Firms at Home," The Wall Street Journal, Wednesday, Dec. 9, 1981, p. 33.
Bleiberg, Robert M., "Market Winner, Financial Futures Have Scored Remarkable Gains," Barron's National Business and Financial Weekly, Dow Jones & Company, Inc., Nov. 30, 1981, p. 7.
Ettorre, Barbara, "Faces Behind the Figures", Forbes, Aug. 30, 1982, p. 139.
Wall Street Letter, Aug. 30, 1982, p. 7.
Wall Street Letter, Aug. 2, 1982, p. 3.
Dunne, Nancy, "Dawn of Electronic Age for Futures", London Financial Times, Wednesday, Dec. 23, 1981, p. 1.
"INTEX Update for Members", Nov. 1982, p. 1.
Witcher, S. Karene, "New Exchange Plans Commodity Trading Through Computers: Intex Won't Have Noisy Floor When it Offers Contracts on Gold and Bonds", Update: The Wall Street Journal, Thursday, Aug. 5, 1982, p. 1.
Gampetro, Tony, "Intex Unveils Trade Contracts", Journal of Commerce, Thursday, Aug. 5, 1982, p. 1.
"Testimony of K. Richard B. Niehoff, President of Cincinnati Stock Exchange", Washington, D.C., Sep. 24, 1979, pp. 1-10.
Peake, Mendelson, and Williams, "The National Book System, An Electrically Assisted Auction Market", (Together with letter of transmittal to the Securities and Exchange Commission, in response to Release No. 12159/Mar. 2, 1976), Apr. 30, 1976, 105 pages.
"A Feasibility Study for the Toronto Stock Exchange", Jun. 12, 1970, pp. 1-165 and Appendix 1-14.
"Good-bye to the pits?, Intex may not put the commodity pits out of business, but lots of members have signed up—just in case it catches on", Financial World, Feb. 28, 1983, pp. 35-37.
Morris, John, "Contracts are Listed for Bermuda's Exchange", American Banker, Oct. 20, 1981, 4 pages.
"INTEX, This new Exchange is the fastest and most accurate futures trading system anywhere—and it's world-wide. That's INTEX. Yes, that's INTEX", Bermuda, Jun. 17, 1982, p. 1.
"INTEX Update for Members", Sep. 15, 1982, pp. 1-2.
"The U.S. National Market System: Progress, Problems, and Issues", Remarks by William M. Batten, Nov. 13, 1980, pp. 1-23.
"News Release, The New York Stock Exchange, NYSE Chairman Cites Progress on National Market System", Sep. 24, 1979, pp. 1-4.
"Remarks by William M. Batten, Chairman, New York Stock Exchange, Inc. Before the Committee on Oversight and Investigations and the Subcommittee on Consumer Protection and Finance of the Committee on Interstate and Foreign Commerce of the House of Representatives", Sep. 24, 1979, pp. 1-6.
"An Assessment of Progress Toward the Development of a National Market System", Sep. 24, 1979, pp. 1-20.
"House Scrutinizing Pace of National Market System Formulation," Securities Industry Association, Washington Report, Oct. 1, 1979, p. 1.
Melton, William C., "Corporate Equities and the National Market System," Federal Reserve Bank of New York, vol. 3, No. 4, 1978-79, pp. 13-25.
"Memo to All NASD Members, regarding Commencement of Trade Reporting in National Market System Tier 1 Securities", Feb. 12, 1982, 10 pages.
"First Annual National Market System Conference", Plaza Hotel New York, Jun. 15-17, 1978, pp. 1-90.
Fuller and Simon, "The National Market System in Perspective: A Selective Outline of Significant Events", May 15, 1978, 56 pages.

(56) References Cited

OTHER PUBLICATIONS

Melton, William C., "Corporate Equities and the National Market System", FRBNY Quarterly Review/Winter 1978-79, pp. 13-25.
"The Battle for a National Market System", Wall Street Journal, Tuesday, Jun. 1, 1982, p. 1.
Williams, Harold M., "The National Market System in Perspective", Dec. 1, 1977, pp. 1-22.
"Instructions for Trade Reporting and Entry of Size in the Nasdaq/National Market System", Feb. 1982, 18 pages.
"A Report of Progress on National Market System and Related Developments at the New York Stock Exchange", Nov. 20, 1978, 16 pages.
Memo to NASDAQ Level II and Level III Subscribers from John H. Hodges, Jr. regarding Commencement of Trade Reporting in NASDAQ National Market System Tier 1 Securities, dated Feb. 10, 1982, 2 pages.
Williams, Harold M., "The Securities Industry and the National Market System: A Current Perspective", News, Securities and Exchange Commission, Nov. 30, 1978, 29 pages.
Securities Week, Mar. 19, 1979, 2 pages.
Williams, Harold M., "The Securities Industry Entering the Eighties: An Economic Overview," News, Securities and Exchange Commission, Nov. 29, 1979, 31 pages.
Williams, Harold M., "The National Market System: An Update", News, Securities and Exchange Commission, Oct. 5, 1980, 45 pages.
"Why the Big Players Want a Piece of Instinet", Money & Markets Fortune, Aug. 19, 1985, p. 1.
Sporleder, Thomas L. and Davis, Ernest E., "Cattlex, A Computerized Cash and Contract Market for Feeder and Stocker Cattle, Operating Procedures and Trading Techniques", Technical Report No. 813, Apr. 1981, 40 pages.
Lorie, James H., "Conjectures on the Securities Industry in 1982", Chapter II, pp. 29-39.
Merrill Lynch, Pierce, Fenner & Smith Incorporated, "Proposal for a National Market System" Oct. 16, 1975, pp. 1-28.
Peake, Junius W., "Computers, Competition and Monopoly", Mar. 25-26, 1977, 10 pages.
"SEC Clears Cincinnati Exchange to Offer First All-Electronic Stock Trading in U.S.", The Wall Street Journal, Tuesday, Apr. 11, 1978, p. 1.
Peake, Junius W., "The Regulatory Role in Systems Development", Mar. 25-26, 1977, p. 1-9.
Peake, Junius W., "Order Flow, Market Making and the National Market System", Mar. 15, 1978, p. 1-7.
Peake, J W., "The Trader and Automated Execution: Where Is It Leading, and Why?", 1983, p. 1-6.
Rees, John, "An Exclusive Interview with the Governor of the Pacific Stock Exchange", The Review of the News, Dec. 19, 1979, pp. 31-46.
Peake, Junius W., "Treasury Marketable Securities Systems", Jun. 14, 1983, pp. 1-39.
Peake, Junius W., "The Investor, the Institution and the National Market System", Jan. 25, 1978, pp. 1-11.
NASD Recommendations to the SEC on Qualifications for Securities in the National Market System, to Honorable Harold M. Williams from Gordon S. Macklin, Jun. 7, 1978, pp. 8-12.
Peake, Junius W., "The "Crowd" and the National Market System", Jun. 14, 1978, 21 pages.
"International Commodities Clearing House Limited, General Regulations for Future Delivery Business and Byelaws for Options", Sep. 6, 1982, 4 pages.
Fuller, James W., et al., "Outlook for the U.S. Securities Industry 1981", vol. II, Final Report, Jun. 1977, Chapters 1-11, 414 pages.
Zyncon Corporation, "Communications Study for World Energy Exchange", Jul. 26, 1983, 21 pages.
Letter to Mr. Andrew M. Klein of the Securities and Exchange Commission from Weeden & Co, Donald E. Weeden, Oct. 20, 1978, 10 pages.
Hutchinson, A.M., "Candat Displays for Cats Terminals", Dec. 5, 1974, 6 pages.

"National Securities Trading System Review for Securities and Exchange Commission", Apr. 15, 1982, pp. 1-21.
Cleland, H., "Draft Appendix D: Outline of Method and Criteria for Evaluation of Cats as a Mechanism to Replace the TSE Trading Floor-Possible Schedule for Implementation", Jun. 3, 1976, Part I and Part II, 10 pages.
McAvoy, B.J., "Cats Pilot, General Outline for Testing CATS", Feb. 24, 1976, 3 pages.
McAvoy, B.J., "Status of Cats", May 31, 1976, 2 pages.
"Cats Project Applications Today: Trader Training, Simulated Trading, Live: Stock Trading, Evaluation: Plan and Timing" The Toronto Stock Exchange, Mar. 2, 1976, 4 pages.
Letter to Mr. George A. Fitzsimmons, Secretary, Securities and Exchange Commission, from K. Richard B. Niehoff, Jul. 24, 1979, 6 pages.
Letter to Martin L. Budd, Security and Exchange Commission, from Peake, Mendelson and Williams, Nov. 4, 1976, 5 pages.
"NYSE-IBM Study Years Ago Urged Development of Electronic Trading Arena", Securities Week, Nov. 22, 1976, 2 pages.
Ardron, J.M., "Current Status on CATS", Apr. 1, 1977, pp. 1-3.
Ardron, M., "CATS Status Overview", Mar. 17, 1977, pp. 1-5.
Maron, J., "CATS Activities", Dec. 2, 1977, pp. 1-5.
Letter to Harold M. Williams of Securities and Exchange Commission, from MSE Richard B. Walbert, regarding File Nos. S7-735 and S7-759, Nov. 24, 1978, pp. 1-66.
Maron, J., "CATS—Special Terms Market", Oct. 26, 1976, pp. 1-2.
McAvoy, B.J., "Proposal for Training CATS Users", Feb. 23, 1976, pp. 1-9.
Letter to Mr. Junius W. Peake from Dan W. Schneider, United States Department of Justice, Mar. 22, 1979, 4 pages.
Letter to Mr. George A. Fitzsimmons of Securities and Exchange Commission, from Securities Industry Association, regarding Development of Order Routing and Market Linage Systems, Aug. 4, 1978, pp. 1-20.
Ardon, et al., "A Planning Report for the Toronto Stock Exchange", Jun. 1969, 44 pages.
"Report to Members—TSE Project to Investigate Computer Assisted Trading", The Toronto Stock Exchange, Notice to Members No. 1827, Feb. 14, 1979, 11 pages.
Report to Mr. K. Richard B. Niehoff from Deloitte Haskins and Sells, Nov. 14, 1978, pp. 1-32.
Letter to John S. R. Shad of Securities and Exchange Commission, from the Cincinnati Stock Exchange, Dec. 31, 1981, pp. 1-3.
"Cats Service and Information Centre," The Toronto Stock Exchange, CATS Project Notice 79-3, Mar. 15, 1979, 175 pages.
Williams, Harold M., "Progress Toward the Development of a National Market System", 1979, 549 pages.
Memo to Mr. J.R. Kimber and Mr. W.L. Somerville, from Mr. M. Ardron, regarding Planning Study for Computer-Assisted Trading (1), Aug. 26, 1969, 4 pages.
Wall Street Letter, Nov. 7, 1983, 1 page.
Update, INTEX Press Information, Sep. 20, 1982, 3 pages.
Brown, Sidney, "Electronic Commodities Market to Operate Offshore", Dollar, The International Journal of American Investments, May 1982, 1 page.
O'Toole, Edward T., "Surge in Financial Futures Is Only the Beginning," Dollar, The International Journal of American Investments, May 1982, 4 pages.
"Want to Play the Market? Try Index Futures", Dollar, The International Journal of American Investments, May 1982, 1 page.
"A Glossary of Financial Futures Terms", Dollar, The International Journal of American Investments, May 1982, 1 page.
Mendelson, Morris, "From Buttonwood to Satellite Via Wall Street", Dec. 1977, pp. 1-33.
Commodity Futures Law Reporters, Futures Trading Act of 1982, No. 175, Jun. 7, 1982, 248 pages.
Letter to Mr. Martin L. Budd of National Market Advisory Board, from Peake, Mendelson and Williams, Aug. 20, 1976, pp. 1-6.
"Automated Bond System", The New York Stock Exchange, Automated Bond System, Securities Week, Oct. 1, 1978, 4 pages.
"NYSE-IBM Study Years Ago Urged Development of Electronic Trading Arena", Security Week, Nov. 22, 1976, pp. 3-4.

(56) References Cited

OTHER PUBLICATIONS

"Securities Pacific Links With Intex to Automatic Money Markets", Securities Week, Aug. 2, 1982, 1 page.

"Automated Trading Concept", The Banker, Apr. 1982, 1 page.

"Regulations, The International Futures Exchange (Bermuda) Ltd.", Jan. 15, 1983, 87 pages.

Batten, William M., "The ABC's of the ABS", Nov. 22, 1977, pp. 1-15.

Appleby, Spurling & Kempe, "Bye-Laws of the International Futures Exchange (Bermuda) Limited", Jul. 8, 1981, 54 pages.

Morris, John, "Bermuda Says Yes to Futures Trading", American Banker, Wednesday, Jul. 8, 1981, 1 page.

"Statement of the American Stock Exchange, Inc. Before the Joint Hearings of the House Subcommittee on Oversight and Investigation and the House Subcommittee on Consumer Protection and Finance on the Development of a National Market System", Sep. 24, 1979, 13 pages.

"The Emerging National Market System", Feb. 7, 1977, 2 pages.

"Interest rate products: Eurodollar bundles", *Chicago Mercantile Exchange*, http://www.cme.com/products/interest_rate/products_interestrate_ed_bundles.cfm, printed on Feb. 9, 2003, pp. 1-3.

Excerpt from CME's 2002 Rulebook, Chapter 5 Floor Privileges—Trading Qualifications and Practices, printed Jan. 2, 2003, pp. 10-21.

Gampetro, Tony, INTEX Gearing up for Autumn Opening, Financial Futures Focus, Commodities, p. 7A.

Yutaka Fukushima: "Method of Matching Orders and Price Volatility in JGB Futures Market—Analysis of Strategic Order, Appropriate Trade Rule in Accordance with Market Condition" 2001 the 9$^{th}$ Conference of Nippon Finance Association Draft Report, Jun. 3, 2001, p. 303 to 316.

Naoto Isaka: "Mechanism for Recovery of Liquidity After Large-Scale Macro Shock—Tokyo Stock Exchange just after Sep. 11" 2003 fiscal year the 11$^{th}$ Conference of Nippon Finance Association Draft Report, Jun. 7, 2003, p. 317 to 331.

Sadakazu Osaki: "Review of Circuit Breaker in U.S." Capital Market Quarterly, Winter 1998, Nomura Research Institution, Ltd., Feb. 1$^{st}$, 1998, vol. 1 No. 3. page 46-52.

Kengo Fukamachi: The American Futures & Options Trading, Toyo Keizai Inc. Jul. 20$^{th}$, 2000, first edition, p. 70-76.

Notification of Reasons for Rejection, Japanese Patent Office, Application No. 2006-521123, Nov. 10, 2009, 4 pages.

International Search Report in related Application No. PCT/US2008/075974 dated Nov. 21, 2008.

Written Opinion of the International Searching Authority in related Application No. PCT/US2008/075974 dated Mar. 25, 2010.

International Search Report in related Application No. PCT/US2008/075980 dated Nov. 21, 2008.

Written Opinion of the International Searching Authority in related Application No. PCT/US2008/075980 dated Mar. 25, 2010.

Office Action dated Aug. 8, 2010 in related Japanese Patent Application No. 20026-521123 (3 pages).

Japanese Office Action (and English translation) from Japanese Application No. 2010-228625 dated Oct. 16, 2012.

* cited by examiner

SYSTEM AND METHOD FOR CONTROLLING MARKETS DURING A STOP LOSS TRIGGER

RELATED APPLICATIONS

This invention claims priority to and incorporates by reference U.S. Provisional Patent Application Ser. No. 60/490,145, filed Jul. 25, 2003.

FIELD OF THE INVENTION

This invention relates to a system and a method that monitor investments, and more particularly, to a system and a method that monitor, and in some instances, mediate an unbalanced market.

BACKGROUND

The speed in which trades are executed through electronic trading systems provide many benefits. Electronic trading systems can facilitate a large number of market transactions. The greater the number of market transactions, the greater a market's liquidity. In liquid markets, prices are driven by competition; prices reflect a consensus of an investment's value; and trading systems provide a free and open dissemination of information.

While speed and efficiency in electronic markets can enhance trader wealth, these qualities can also increase the adverse affect of a trade that triggers an election of buy or sell stop orders. In a futures market that has few resting orders but many stop orders, an order executed at a limit price can cause a cascading execution of buy or sell stop orders. The triggering and election of these stop orders can seem almost instantaneous lowering the value of a market in just a few seconds.

The problem may occur when one or more trades bring many stop orders into the market. A fast execution of these stop orders may prevent opposite side orders from entering the market, preventing buyers from competing against other buyers and sellers from competing against other sellers. An onset of stop orders may enter the market in the following sequence:

1. A stop order, triggered by a trade, enters the market at a limit price.

2. The limit price trades almost immediately.

3. A second stop order to buy, triggered by the last trade, enters the market at a higher limit price (or a lower limit price if the order is a stop order to sell).

4. This new limit price trades almost immediately.

5. A third stop order to buy, triggered by the last trade, enters the market at a higher limit price (or a lower limit price if the order is a stop order to sell) and so forth. The order processing sequence occurs quickly; so quickly that traders are not be able to prevent the buy or sell stop orders from trading away from the current market prices by entering opposite side orders.

The entire process may be illustrated through a hypothetical E-Mini S&P 500 futures market ("ESM3"). In Table 1, an order entered on the bid side of the market for a quantity of 1 at a price of 873.75, trades. As the order trades, multiple stop orders enter the market, which in turn trade and bringing other stop orders into the market. In the ESM3 market,

TABLE 1

| | | | ESM3 | | | |
|---|---|---|---|---|---|---|
| TON | | QTY | BID | ASK | QTY | TON |
| TON 6 | Stop (88075) | 5 | 88475 | 87375 | 10 | TON 1 |
| TON 7 | Stop (87875) | 5 | 88475 | 87475 | 5 | TON 2 |
| TON 8 | Stop (87825) | 5 | 88325 | 87675 | 5 | TON 3 |
| TON 9 | Stop (87675) | 5 | 88475 | 87900 | 1 | TON 4 |
| TON 10 | Stop (87525) | 5 | 88475 | 88075 | 1 | TON 5 |
| TON 11 | Stop (87375) | 10 | 87900 | | | |
| TON 12 | Stop (87375) | 10 | 87675 | | | |
| Incoming | | 1 | 873.75 | | | |

Trade 1 Incoming (1-lot) trades with Trade Order Number (TON) 1 (1-lot) at 873.75;

TON 12-Stop (87375), TON 11-Stop (87375) are triggered by Trade 1;

Trade 2 TON 12 (9-lot) trades with TON 1 (9-lot) at 873.75;

Trade 3 TON 12 (1-lot) trades with TON 2 (1-lot) at 874.75;

Trade 4 TON 11 (4-lot) trades with TON 2 (4-lot) at 874.75;

Trade 5 TON 11 (5-lot) trades with TON 3 (5-lot) at 876.75;

TON 10-Stop (87525), TON 9-Stop (87675) are triggered by Trade 5;

Trade 6 TON 11 (1-lot) trades with TON 4 (1-lot) at 879.00;

TON 8-Stop (87825) and TON 7-Stop (87875) are triggered by Trade 6.

Trade 7 TON 10 (1-lot) trades with TON 5 (1-lot) at 880.75; and

TON 6-Stop (88075) is triggered by Trade 7.

After the cascading triggers of stop orders trade, the final resting price of the market drops to 884.75.

TABLE 2

| | ESM3 | | |
|---|---|---|---|
| QTY | BID | ASK | QTY |
| 19 | 88475 | | |
| 5 | 88325 | | |

To mitigate the harmful effects of a cascading trigger of stop orders, some Exchanges have adopted policies and procedures that, in the appropriate case, permit the cancellation or busting of selected trades. However, the cancellation or busting of trades does not occur simultaneously and is not in the best interest of market participants. An Exchange must first identify the problem and then decide on a solution.

In the hypothetical E-Mini S&P 500 futures market, first the Exchange must determine what caused the market movement. Once that problem is discovered, the Exchange would then have to decide if the market movement lies outside of a "no-bust range." In a "no-bust range," trades executed within a price range may not be subject to cancellation, even if executed in error. Trades executed at prices outside of the Exchange's "no-bust range" are considered as quite possibly being beyond normal market forces. Considering the high interdependence of many markets, disruptions may occur in other related markets such as the Nasdaq-100 Index or a larger S&P 500 futures contract that are highly correlated to the hypothetical E-Mini S&P 500.

While such decisions are considered, traders are exposed to serious market risk until a decision is made and until they are notified of the decision. Furthermore, traders will not know if their gains or loses will be reversed. Traders that were short before the cascade of stop order triggers occurred and bought at the bottom of the market may not realize expected gains. Similarly, traders that went long after the market dip could lose their expected gains. Because gains and loses may disappear the instant an Exchange announces that trades will be busted, some traders will not spend unrealized money on new trades. Other traders may be forced out of the market until the decision to bust trades is reached to avoid an unexpected margin call.

The present invention is directed to a system and method that overcome some of these potential drawbacks in the prior art.

SUMMARY

The present invention is defined by the following claims. This description summarizes some aspects of the present embodiments and should not be used to limit the claims.

A system mitigates the effects of a market spike caused by the triggering and the election of a conditional order in an automated matching system. The system comprises evaluation logic, delay logic, pricing logic and timing logic. The evaluation logic monitors orders submitted to a trading engine. The evaluation logic is configured to compare an execution price of an order to a predefined price range. The delay logic delays the matching of orders submitted to the trading engine when the execution price of an order lies outside of the pre-determined price range. The pricing logic derives an opening price to be used by the trading engine. The timing logic measures a time interval used to delay a matching of the orders until the opening price is within a predefined price range or an interval of time lapses.

A method of mitigating the effect of a market spike caused by the triggering and the election of an order comprises monitoring orders submitted to the trading engine. The method compares an execution price of a conditional order to a predefined price range and delays the matching of orders submitted to the trading engine when an execution price of the order lies outside of the pre-determined price range. The method derives an opening price to be used by the trading engine; and measures the time interval that delays the matching of the orders until the opening price is within a second predefined price range or a time interval lapses. The method may be repeated to ensure that the opening price reflects a current market movement.

An alternative embodiment includes a matching engine. When a matched order changes a last traded price level, a matching engine checks a stop order book to determine if any new stop orders can be introduced into the market. When a difference between an original price and a currently traded price caused by a stop execution reaches a predefined threshold, the matching engine sends a command to reserve, or temporarily suspend matching, for a predefined period of time. Thus allowing opposite side orders to enter the system in response to this event.

During this suspension of trading, an indicative opening price (IOP) is calculated and stops, resting orders and newly arriving orders resolve into a single price opening. In this embodiment, the single price opening may use pre-opening and circuit breaker logic used in Exchanges. The nature of this opening is such that stop orders, once synthetically introduced during a reserved or pre-opening state, are filled in a limit price priority sequence instead of in the trigger price sequence used in some continuous trading systems. This effectively breaks a stop order ladder and allows the market to trade at more appropriate price levels.

An alternative method checks the value of a single price opening and compares the price to the last traded price to verify that the price is within the previously specified threshold. If it is not within the threshold, another timing window will lapse and the method check is repeated at a second predefined threshold, such as twice a defined threshold, etc. After a predefined or programmed number of iterations of timing windows lapses or a manual intervention occurs, the product opens and the matching engine matches orders regardless of a price movement.

Further aspects and advantages of the invention are described below in conjunction with the present embodiments.

DETAILED DESCRIPTION OF THE PRESENT EMBODIMENTS

The present system and method mitigates or prevents market spikes due to the triggering, election and trading of conditional orders. The present embodiments include a trading engine that performs a verification of a tradable conditional order that is triggered, to ensure that a traded price will not violate a predefined trade threshold or existing Exchange matching rules. If a potential trade price lies outside of the trade threshold, the instrument is placed in a reserved state allowing orders to be entered, modified, and/or cancelled.

While an instrument may not trade when it is reserved; an indicative opening price of that instrument may be derived and disseminated to the market. The indicative opening price may reflect the price the instrument would be trading at if the market were open. Placing an instrument in a reserved state allows market participants to enter additional orders that adjust the indicative opening price to a level that reflects buyers competing with other buyers and sellers vying against other sellers. The present embodiments may suspend trading until the market is adjusted within a threshold range, or when a period of time lapses. The period of time may vary in length in relation to the time of day, the product traded, market volatility and/or any other relevant market condition or combination of market conditions. Similarly, the threshold range may vary by the product and/or the time of day.

Figure 1:
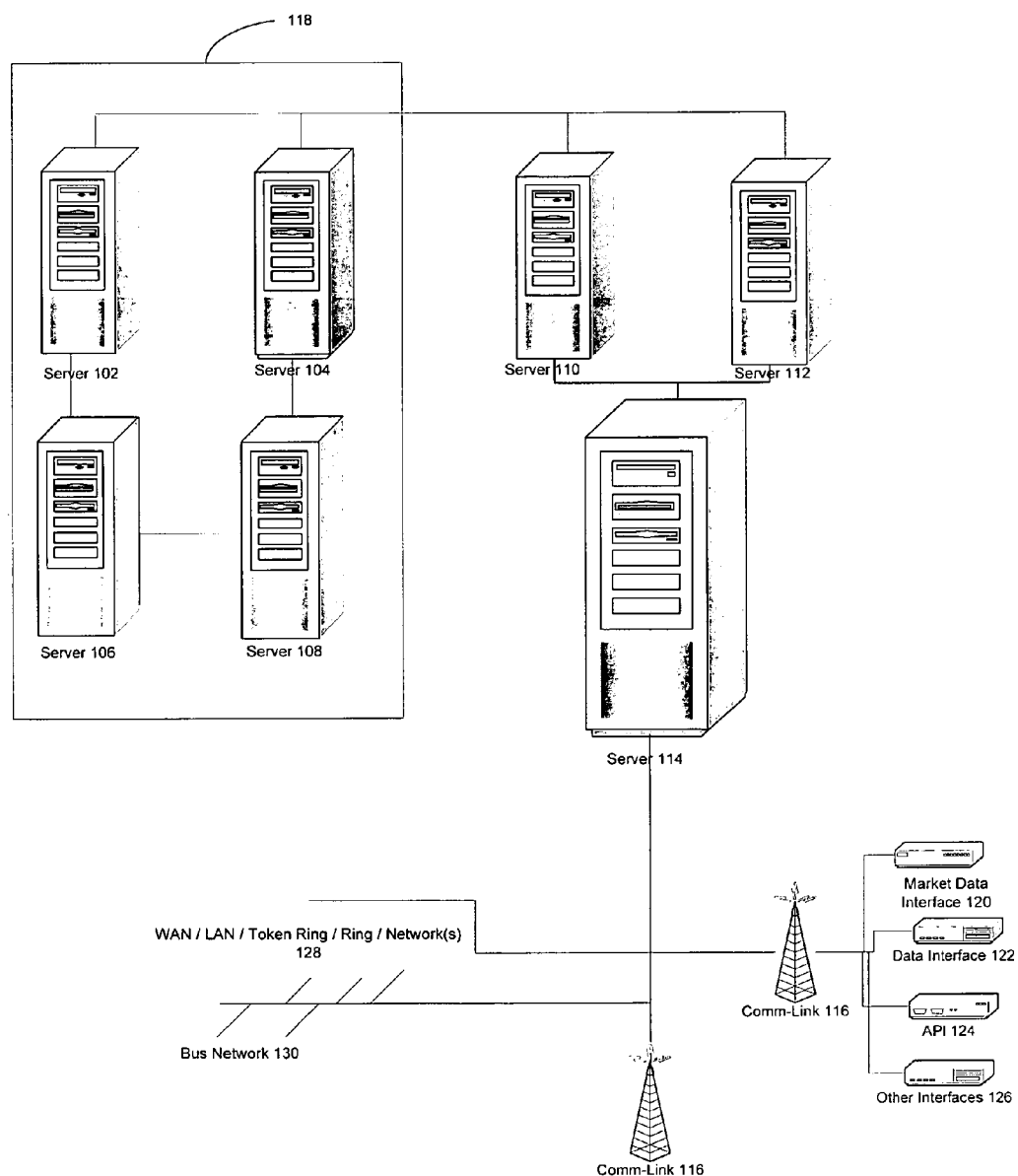
FIG. 1 is system diagram encompassing a present embodiment.

FIG. 1 is a system diagram encompassing a present embodiment. The figure illustrates a hub-and-spoke system, wherein each resource, application, or order flows through a single entity (e.g., the hub 114) before being received by servers 110-112. In this embodiment, the hub 114 and the servers 102-112 may be integrated into a single server or comprise a server cluster made up of a group of independent computers that work together as a single system but present the appearance of a single server to one or more clients.

In FIG. 1, the clients are illustrated as interfaces 120-126, and one or more networks such as a wide area network ("WAN"), a local area network ("LAN"), a ring network, a token ring network, a bus network, 128 and 130, etc. Other peripheral devices may be coupled to hub 114, such as a printer, a speaker, and/or any other device.

Preferably, the hub 114 comprises a management server. The management server receives, converts, and transfers data in a form compatible with protocols used by servers 110-112, a communication link 116, the interfaces 120-126, and/or the networks 128 and 130. The interfaces may include an application programming interface (an "API") 124, a data interface 122, a market data interface 120, and/or other interfaces 126, for example. Preferably, the market data interface 120 provides quote vendors with access to selected output disseminated from the hub 114.

In FIG. 1, the hub 114 provides routing control to a trade matching system, such as an automated trading engine shown as servers 110 and 112. When orders are matched automatically by a matching algorithm or system within one or both of the servers 110 and/or 112, preferably the details of the trade and information of interest to the market are disseminated to quote vendors and trade participants that include the buyers and the sellers.

Figure 2:
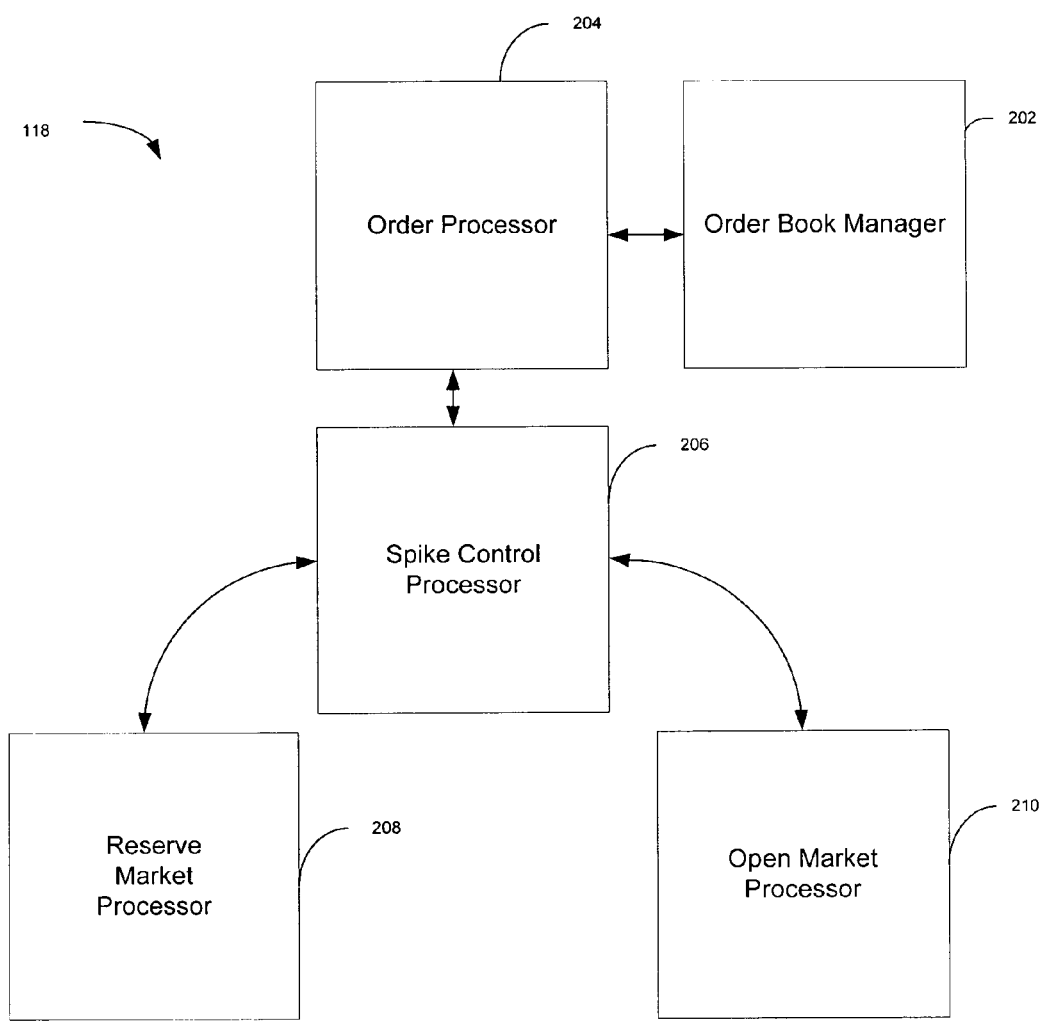
FIG. 2 is a block diagram of a trade evaluation system of FIG. 1.

Preferably, the trade evaluation system 118, shown as servers 102-108 in FIG. 1 interfaces the hub 114. In the embodiment of FIG. 2, the trade evaluation system 118 may include an order book manager 202, an order processor 204, a spike control processor 206, a reserve market processor 208, and an open market processor 210. In the embodiment shown in FIG. 3, the trade evaluation system 118 may include evaluation logic 306, delay logic 308, pricing logic 310, and timing logic 312. Preferably, the evaluation logic 306 and order processor 204 calculate a price threshold or price that extends above and below a selected or a theoretical price. Such a threshold or interval may be fixed within a number of ticks above and below a last traded price. The threshold or interval may vary by product, instrument, contract, or other relevant market considerations.

When the present system and method is used in a futures Exchange, the price threshold or range may comprise a no-bust range that defines a price interval within which transactions that fall within that interval are not subject to cancellation by the Exchange. Preferably, trades that fall within the no-bust range do not have a significant adverse effect on the market, and therefore, the trade stands even in error. In these embodiments, the trades that fall within the no-bust range cannot be cancelled by agreement. In other embodiments, trades that fall within the no-bust range may be cancelled by an agreement between market participants.

Preferably, the market data interfaces 120, the data interfaces 122, the networks 128 and 130, the APIs 124 and the other interfaces 126 provide market participants, quote vendors, and others with real and/or delayed time access to trade data. The trade data can include investment prices such as futures contract prices, settlement prices, bids, offers, and other Exchange related or derived information. In some embodiments, inter-process communication methods, such as a Dynamic Data Exchange ("DDE") and/or an Object Linking and Embedding ("OLE") are used to exchange data and commands between two or more servers or applications that run simultaneously.

As shown in FIG. 2, the trade evaluation system 118 includes an order book manager 202, an order processor 204, a spike control processor 206, a reserve market processor 208, and an open market processor 210. Preferably, orders flow into the order processor 204 and are maintained by the order book manager 202. The order book manager 202 may maintain the Exchange's order books, manage communication with an automated trading engine, and allow an Exchange administrator to establish order filters (e.g., trading authorizations, instrument access, price bands, trading limits, etc.).

The order book manager 202 may also retain a predefined or a programmable parameter used by order process logic or the order processor 204. In this embodiment, instrument parameters are stored in a table of rows and columns. In another embodiment, the parameters are stored in a data structure comprising a list of entries that use a unique key to identify each entry. The data structure may include a set of related values such as a linked list that use a common indexing scheme. In these embodiments, an instrument is reserved when the instrument is stored in a data table or data structure.

Preferably, parameters are initialized on start up of an automated trading engine and are maintained for a predefined period of time such as a trading week. When a conditional order is triggered in a futures market, such as a stop order that enters the market at a limit or market price, the order processor 204 compares an execution price of the stop order to a predefined price threshold such as a no-bust range. Preferably, this comparison determines if the transaction may be completed. If an execution price lies outside of the predefined price threshold, the order processor 204 notifies the spike control processor 206.

Once notified, the spike control processor 206 reserves the instrument through a reserve market processor 208 and activates a verification timer. The verification timer may measure a time interval that varies in length in relation to a time of day, a product, a trader's location, market volatility, and/or any other relevant market conditions or combination of market conditions. At the end of an initial time period, the spike control processor 206 compares an indicative opening price to the predefined price threshold. If the indicative opening price is above/below the predefined threshold, the verification timer is reactivated for an additional iteration that may vary with one or more market conditions. In this embodiment, the indicative opening price is a changing price that may be based on an indicative trade, a better bid, or a better offer. Similarly, a predefined price threshold may comprise a dynamic price range that changes with each iteration.

The spike control processor 206 will reserve a market unless the indicative opening price lies within the predefined price threshold, a predetermined number of iterations or time periods lapse, or a manual intervention occurs. When one of those condition occurs, the spike control processor 206 notifies the open market processor 210 opening the market.

One variable utilized by the spike control processor 206 identifies the duration that an instrument may be held in reserve. A price verification time variable is invoked and a timer activated when the order processor 204 invokes the spike control processor 206. The price verification time variable comprises a programmable or a constant time value.

The spike control processor 248 also uses a price iteration variable. The price iteration variable comprises a programmable multiplier. Preferably, the product of the price iteration variable and price verification time variable calculates a maximum length of time an instrument may remain in a reserved state. If the price verification time variable is five seconds and the price iteration variable is eleven, the maximum time the market may be in a reserved state is fifty-five seconds. The time variables are initialized on start up and are maintained for a length of time, such as a trading week. If the variables are changed before the period lapses, such as in the middle of a trading week, the variables may be update in a real or a delayed time.

Figure 3:
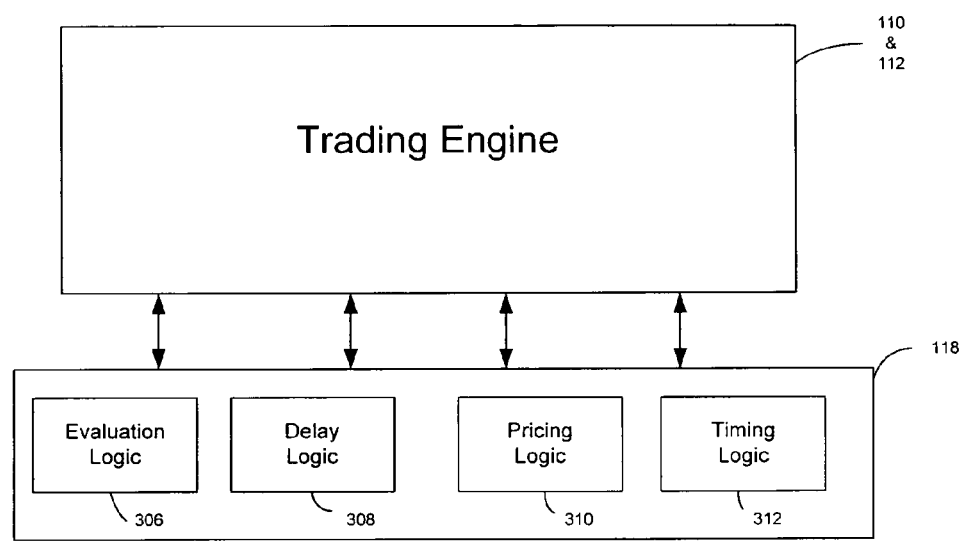
FIG. 3 is a block diagram of an alternative trade evaluation system of FIG. 1.

Another embodiment of the trade evaluation system 118 shown in FIG. 3 couples a trading engine 110 and 112. In this embodiment, the trade evaluation system includes evaluation logic 306, delay logic 308, pricing logic 310, and timing logic 312. Preferably, the evaluation logic 306 monitors orders submitted to an automated matching system or trading engine 110 and 112. The evaluation logic 306 may be programmed or configured to compare an execution price of a conditional order such as a stop order to a predefined price range. Preferably, the price ranges reflects a range of prices that extend above and below an actual or synthetic market price. The price range may differ by product, may be fixed within a number of ticks above and below an actual or synthetic market price, or may vary above and below an actual or synthetic market price. Additionally, a synthetic no bust range may also be used including the no bust ranges disclosed in U.S. application Ser. No. 10/405,025 entitled System and Method for Monitoring Trades of a No-Bust Range in an Electronic Trading System, which is incorporated by reference in its entirety.

While in some embodiments price comparisons can occur in delayed or batch time, preferably, the comparison occurs in real-time, which is within a narrow time period after a potential trade would occur. If the price of the trade is within the price range, the trade stands and an open continuous trading is maintained. If the price of the trade caused by the execution of conditional orders falls outside of the price range, the evaluation logic 306 places the product into a reserved state. Upon its reservation, delay logic 308 determines a maximum time the market may remain in a reserved state.

Pricing logic 310 derives an opening price at which a product would trade upon the opening of the market or an equilibrium price that falls substantially within the overlap of the pending bid and offer prices. Preferably, the pricing logic 310 calculates opening prices upon demand, in delayed-time, or in real-time as orders are received.

Preferably, the delay logic 308 delays the matching of orders submitted to the trading engine 110 and 112. The delay will reserve a product until an opening price lies within a price range, a period of time lapses, or an automated or a manual intervention occurs. Preferably price ranges, delay, and/or the measure of time are retained in an audit trail and/or memory coupled to or resident to the evaluation system 118. The tracking and/or storage of one or more of these values can preserve market integrity and allow an Exchange to review an event.

Figure 4:
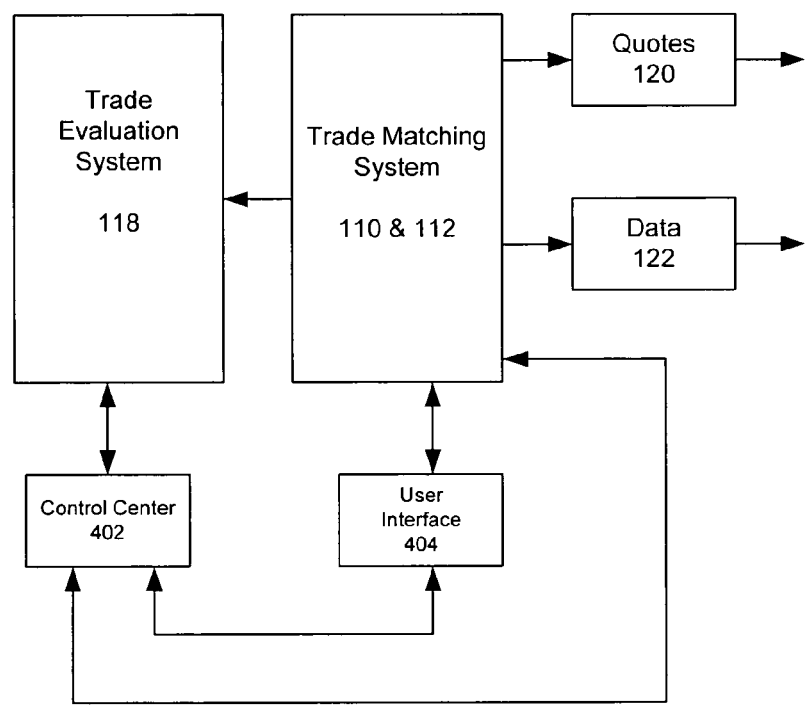
FIG. 4 is a block diagram of FIG. 1.

As shown in FIG. 4, one or more of the components that comprise the trade evaluation system of FIGS. 2 and/or 3 may couple a control center 402 and the trade matching system 110 and 112. Preferably, the trade matching system 110 and 112 uses one or more matching systems or methods, such as a "first in, first out" ("FIFO"), an allocation, a hybrid price/time priority, such as a Lead Market Maker ("LMM"), for example, or any other matching systems or methods to automatically match orders. Once the details of the orders are entered through a user interface 404, preferably, the trade matching system 110 and 112 executes the trade and transmits matched trade data (e.g., instrument type, the price, the quantity, the buyer, the seller, etc.) to the trade evaluation system 118 and the user interface 404. The trade matching system 110 and 112 also transmits matched trade data and quote data to the quote and data vendors 120 and 122. Preferably, the matched trade data and quote data describe recent market movements.

Through a control center 404, preferably an Exchange or a member of the Exchange oversees the reservation of products in the market. The control center 404 may manually or automatically override the trade evaluation system 118 or perform a state change on any product, instrument, parameter, or group. The control center may view, configure, and program the predetermined price thresholds and timing variables of FIG. 2 to any market condition or combination of market conditions just as it may view, configure, and program the logic of FIG. 3 to such market conditions.

To assure that market participants and the Exchange are aware of the status of the market or any changes to thresholds, variables, or logic, preferably, the evaluation system 118 may provide a notice to the user interfaces 120-126 (FIG. 1) and 404 (FIG. 4), the control center 404 (FIG. 4), and any communication system. In some instances, each of the embodiments may provide selected notices only to the control center 404, allowing the Exchange to notify the market of certain conditions if needed through a messaging system.

Because market participants may not be aware that a product or an instrument is reserved due to the large volume of messages sent over an electronic trading system or because the market participants are no longer trading, the present system and method also may encompass independent communication systems that are coupled to the trade evaluation system 118 to convey information, warnings, or alerts about an instrument in a reserved state. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of the state of the market in a narrow timeframe.

The present system and method mitigates or prevents market spikes caused by the triggering, election, and trading of conditional orders. An embodiment of the method may be translated into a computer readable medium, programming instructions (e.g., code), or information that can be stored and retrieved from a volatile or non-volatile memory.

Figure 5:
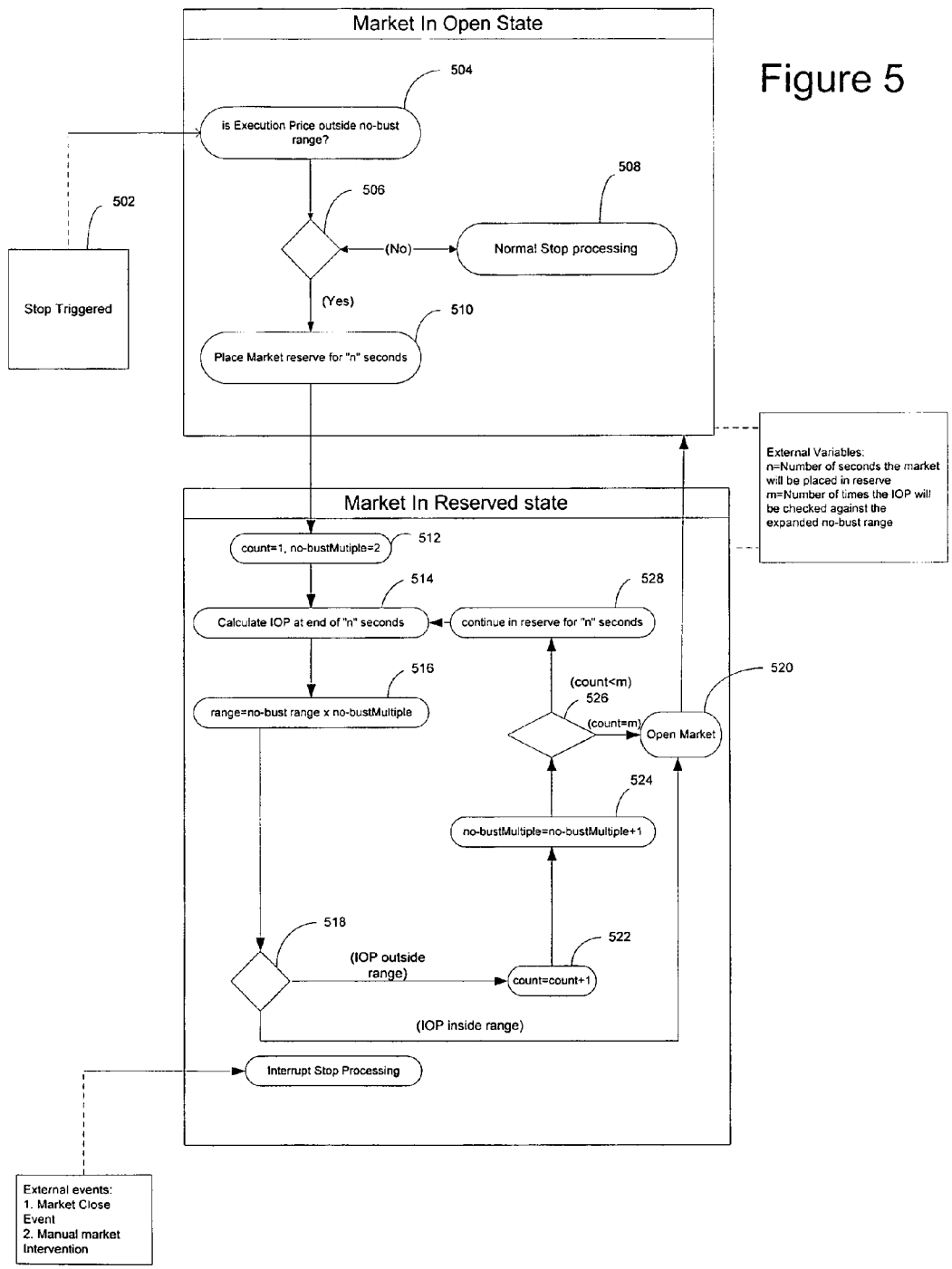
FIG. 5 is a flow diagram of a present embodiment.

Any Exchange, such as a futures Exchange that enforces a no-bust range or another price range may use the method shown in FIG. 5. The method may be encoded in a signal bearing medium, a computer readable medium such as a memory, programmed within a device such as one or more integrated circuits, or processed by a controller, a computer, a server, or a server cluster. If the methods are performed by code or software, the code or software may reside in a memory resident to or interfaced to the trade matching system 110 and 112 of FIG. 1 or 3, a communication interface, or any other type of non-volatile or volatile memory interfaced or resident to the trade evaluation system 118 of FIG. 2. The memory may include an ordered listing of executable instructions for implementing logical functions. A logical function may be implemented through digital circuitry, through source code, or through analog circuitry. The code or software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports code or software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber (optical). A machine-readable medium may also include a tangible medium upon which code or software is printed, as the code or software may be translated into a high-level language that may be compiled through a scanner, and/or interpreted or otherwise processed. The processed medium may then be stored in a computer and/or machine memory.

As shown in FIG. 5, a stop order is triggered and enters the market at a limit price or at a market price at act 502. In this embodiment, a stop order, sometimes called a stop-loss order, or simply a stop, is an order to buy or sell at a limit price when the market reaches a specified price. A limit price is a specified price or a price that is more favorable to the trader. A limit order to buy will be executed at or below the specified price limit. A limit order to sell will be executed at or above the specified price limit.

At act 504, the method compares an execution price to a no-bust range that is calculated separately for each product or instrument. The no-bust range may comprise a synthetic price range or a last traded price plus or minus a no bust-range variable.

If the price of the trade lies within the no-bust range, the trade stands and open continuous trading is maintained at acts 506 and 508. The process will then be applied each time a stop order would create a trade. A price comparison is performed at each tradable price level of the market.

If the price of the trade falls outside of the no-bust range, preferably, the product is placed into a reserved state at acts 506 and 510. Upon its reservation, a timer that is coupled to or resident to a trading engine is activated. A counter will also be activated to track the number of times an indicative opening price verification process is performed.

In the illustrated embodiment, the counter is initialized to "1" at act 512. Preferably, the counter cannot exceed a value that is retained in a table or a data structure. If more than one comparison to an indicative opening price occurs, a varying price range (e.g., an expanded no-bust range) will be determined for verification of an indicative opening price. The varying price range may comprise a product of the no-bust range and a multiplier. Preferably, the multiplier increases incrementally or in multiples each time an indicative opening price verification occurs.

Once a predetermined length of time lapses, an indicative opening price and a price range are calculated and broadcast to the market through a data feed at acts 514 and 516. The indicative opening price represents a price at which a product would trade upon an opening of a market. An indicative opening price may comprise an equilibrium price that falls within an overlap of bid and offer prices.

A comparison of an indicative opening price to a calculated price range occurs at act 518. If the indicative opening price lies within the price range, the market opens, and trading begins at the indicative opening price or a market price. The process resumes when another stop order is triggered at act 502.

If the indicative opening price lies outside of the price range, process variables are incremented at acts 522 and 524, and the process continues until a predetermined number of iterations is reached at act 526. When a maximum number of iterations are reached, a product reopens at act 520 and the process resumes when another stop order is triggered at act 502.

If a maximum number of iterations is not reached, the process resumes when the time variable is read or programmed at act 528 and another indicative opening price is calculated. At act 514, the indicative opening price is a dynamic price that changes as orders are entered into the market and pending orders are modified, and/or cancelled. The present method continues until a predetermined number of iterations is reached or an external event occurs. An external event may include the closing of the market or a manual market intervention.

The above-described embodiments, scale well to large networks, to new products, or to the large volatility that occurs in the markets that trade popular contracts. The embodiments may facilitate any exchange between buyers and sellers, including markets that exchange equities, debt, investment indices, and other investments as well as any commodity or combination or series of commodity contracts, such as bundles that can comprise the purchase of one of a series of consecutive contracts.

When the trade evaluation system 118 is integrated or linked to a trading engine that matches spreads, all related spreads are automatically reserved when the spread lies outside of a predefined threshold. When reserved, all related spread instruments are reserved and any implied spreading becomes inactive. When the market is allowed to open, all spreads corresponding to an underlying leg open. In addition, if a contract is utilizing implied trading, the implied trading will be turned off until the Exchange's rules or other rules allow for a re-initiating of an implied trading.

As shown in FIG. 4, the trade evaluation system 18 may couple a control center 402. Through the control center an Exchange administrator may take an appropriate action on a spread and manually open corresponding spreads. Under these circumstances the implied spreading will remain inactive for a remainder of a trading session. An Exchange administrator may also set a group of differing contracts to a pre-opening, take appropriate action on the spread, and reset an opening for the group of differing contracts. In one embodiment, implied spreading is automatically reactivated at the opening of a market if the states of the investment leg allow it.

The present embodiments described above provide Exchanges and users with a flexible approach and structure that mitigates or prevent sharp rises or declines in market prices due to the triggering, election, and trading of conditional orders. To further illustrate the present embodiments, exemplary markets are described and illustrated.

In a first example, a price verification time is programmed to five seconds and the initial no-bust range is six.

| | | | ESM3 | | | |
|---|---|---|---|---|---|---|
| TON | | QTY | BID | ASK | QTY | TON |
| TON 6 | Stop (88075) | 5 | 88475 | 87375 | 10 | TON 1 |
| TON 7 | Stop (87875) | 5 | 88475 | 87475 | 5 | TON 2 |
| TON 8 | Stop (87825) | 5 | 88325 | 87675 | 5 | TON 3 |
| TON 9 | Stop (87675) | 5 | 88475 | 87900 | 1 | TON 4 |
| TON 10 | Stop (87525) | 5 | 88475 | 88075 | 1 | TON 5 |
| TON 11 | Stop (87375) | 10 | 87900 | | | |
| TON 12 | Stop (87375) | 10 | 87675 | | | |
| Incoming | | 1 | 873.75 | | | |

With the market in a continuous trading state, the following sequence occurs when an Incoming—Buy of 1 @ 873.75 enters the market:

Trade 1 Incoming (1-lot) trades with TON 1 (1-lot) at 873.75;

TON 12-Stop (87375), TON 11-Stop (87375) are triggered by Trade 1;

Trade 2 TON 12 (9-lot) trades with TON 1 (9-lot) at 873.75;
Trade 3 TON 12 (1-lot) trades with TON 2 (1-lot) at 874.75;
Trade 4 TON 11 (4-lot) trades with TON 2 (4-lot) at 874.75;
Trade 5 TON 11 (5-lot) trades with TON 3 (5-lot) at 876.75;
TON 10-Stop (87525), TON 9-Stop (87675) are triggered by Trade 5;
Trade 6 TON 1 (1-lot) trades with TON 4 (1-lot) at 879.00; and
TON 8-Stop (87825) and TON 7-Stop (87875) are triggered by Trade 6.

The market is placed in a reserved state because the trade that would occur at a price of 880.75 would violate the no bust range. The no bust range for ES is currently six. Since the stop iteration began with a trade price of 873.75, the market will not trade past a price of 879.75. The order book will display the following in a reserved state:

| | | ESM3 | | | |
|---|---|---|---|---|---|
| TON # | QTY | BID | ASK | QTY | TON # |
| TON 6 | Stop (88075) | 5 | 88475 | 88075 | 1 | TON 5 |
| TON 10 | | 5 | 88475 | | | |
| TON 9 | | 5 | 88475 | | | |
| TON 7 | | 5 | 88475 | | | |
| TON 8 | | 5 | 88325 | | | |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place using normal indicative opening price logic:
Trade 7 TON 10 (1-lot) trades with TON 5 (1-lot) at 880.75; and
TON 6-Stop (88075) is triggered by Trade 7.

| | ESM3 | | |
|---|---|---|---|
| QTY | BID | ASK | QTY |
| 19 | 88475 | | |
| 5 | 88325 | | |

In a second example, an imbalance condition occurs during execution of a single conditional order. When a sell order enters the market for a quantity of 1 at 860.00, a cascade of stop orders are triggered. In this example, the minimum price that can be traded for this trading session is 854.00.

| | | ESM3 | | | |
|---|---|---|---|---|---|
| TON | QTY | BID | ASK | QTY | TON |
| TON 1 | 1 | 86000 | 85300 | 6 | Stop (86000) | TON 6 |
| TON 2 | 1 | 85900 | | | |
| TON 3 | 1 | 85800 | | | |
| TON 4 | 2 | 85400 | | | |
| TON 5 | 1 | 85300 | | | |
| | | | 86000 | 1 | Incoming |

With the market in a continuous trading state, the following sequence occurs when an Incoming—Sell of 1 @ 860.00 enters the market:
Trade 1 Incoming (1-lot) trades with TON 1 (1-lot) at 860.00;
TON 6-Stop (86000) is triggered by Trade 1;
Trade 2 TON 2 (1-lot) trades with TON 6 (1-lot) at 859.00;
Trade 3 TON 3 (1-lot) trades with TON 6 (1-lot) at 858.00; and
Trade 4 TON 4 (2-lot) trades with TON 6 (2-lot) at 854.00.

The market is placed in a reserved state because the trade that would occur at a price of 853.00 would violate the no bust range. Since the stop iteration began with a trade price of 860.00, the market will not trade past a price of 854.00. The order book will display the following in a reserved state:

| | | ESM3 | | | |
|---|---|---|---|---|---|
| TON # | QTY | BID | ASK | QTY | TON # |
| TON 5 | 1 | 85300 | 85300 | 1 | TON 6 |

After waiting the preset length of time, if the indicative opening price is greater than twice the no bust range (12.00 from the original last price), the market will remain in a reserved state for a second time iteration. In this example, the market will be allowed to open at or near the end of the five second delay and the following trade will take place:
Trade 5 TON 5 (1-lot) trades with TON 6 (1-lot) at 853.00.

| | ESM3 | | |
|---|---|---|---|
| QTY | BID | ASK | QTY |
| | | | |

In a third example, an upper no bust range violation occurs. Like the other examples, the price verification time is programmed to about a five second interval and the initial no-bust range is about six.

In this example, a buy order enters the market for a quantity of at 873.75. The maximum price that can be traded for this trading iteration is 879.75.

| | | ESM3 | | | |
|---|---|---|---|---|---|
| TON | | QTY | BID | ASK | QTY | TON |
| TON 12 | Stop (87375) | 10 | 87675 | 87375 | 10 | TON 1 |
| TON 11 | Stop (87375) | 10 | 87900 | 87475 | 5 | TON 2 |
| TON 10 | Stop (87525) | 5 | 88475 | 87675 | 5 | TON 3 |
| TON 9 | Stop (87675) | 5 | 88475 | 87900 | 1 | TON 4 |
| TON 8 | Stop (87825) | 5 | 88325 | 88075 | 1 | TON 5 |
| TON 7 | Stop (87875) | 5 | 88475 | | | |
| TON 6 | Stop (88075) | 5 | 88475 | | | |
| Incoming1 | | 1 | 873.75 | | | |

With the market in a continuous trading state, the following sequence occurs if Incoming1—Buy of 1 (873.75 enters the market:
Trade 1 Incoming1 (1-lot) trades with TON 1 (1-lot) at 873.75;
TON 12-Stop (87375), TON 11-Stop (87375) are triggered by Trade 1;

Trade 2 TON 11 (9-lot) trades with TON 1 (9-lot) at 873.75;

Trade 3 11 (1-lot) trades with TON 2 (1-lot) at 874.75;

Trade 4 TON 12 (4-lot) trades with TON 2 (4-lot) at 874.75;

Trade 5 TON 12 (5-lot) trades with TON 3 (5-lot) at 876.75;

TON 10-Stop (87525), TON 9-Stop (87675) are triggered by Trade 5;

Trade 6 TON 10 (1-lot) trades with TON 4 (1-lot) at 879.00; and

TON 8-Stop (87825) and TON 7-Stop (87875) by Trade 6.

The market is placed in a reserved state because the trade that would occur at a price of 880.75 would violate the no bust range. The no bust range for ES is currently six. Since the stop iteration began with a trade price of 873.75, the market will not trade past a price of 879.75. The order book will display the following in a reserved state:

| | | ESM3 | | | |
|---|---|---|---|---|---|
| TON | QTY | BID | ASK | QTY | TON |
| TON 10 | | 4 | 88475 | 88475 | 1 | TON 5 |
| TON 9 | | 5 | 88475 | | | |
| TON 7 | | 5 | 88475 | | | |
| TON 6 | Stop (88075) Triggered in IOP | 5 | 88475 | | | |
| TON 8 | | 5 | 88325 | | | |
| TON 12 | | 1 | 87675 | | | |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place:

Trade 7 TON 10 (1-lot) trades with TON 5 (1-lot) at 884.75; and

TON 6-Stop (88075) is triggered by Trade 7.

| | ESM3 | | |
|---|---|---|---|
| QTY | BID | ASK | QTY |
| 18 | 88475 | | |
| 5 | 88325 | | |
| 1 | 87675 | | |

In a fourth example, a lower no bust range violation occurs. Like the other examples, the price verification time is programmed to about a five second interval and the initial no-bust range is about six.

In this example, a sell order enters the market for a quantity of 1 at 860.75. The maximum price that can be traded for this trading iteration is 854.75.

| | | ESM3 | | | |
|---|---|---|---|---|---|
| TON | QTY | BID | ASK | QTY | TON |
| TON 1 | 10 | 86075 | 85975 | 10 | Stop (86075) | TON 7 |
| TON 2 | 5 | 86000 | 85900 | 5 | Stop (86000) | TON 8 |
| TON 3 | 5 | 85900 | 85875 | 5 | Stop (85900) | TON 9 |
| TON 4 | 5 | 85875 | 85500 | 5 | Stop (85875) | TON 10 |

-continued

| | | ESM3 | | | |
|---|---|---|---|---|---|
| TON | QTY | BID | ASK | QTY | TON |
| TON 5 | 1 | 85500 | 85450 | 5 | Stop (85500) | TON 11 |
| TON 6 | 10 | 85450 | | | | |
| | | | 86075 | 1 | | Incoming1 |

With the market in a continuous trading state, the following sequence occurs if Incoming1—Sell of 1 @ 860.75 enters the market:

Trade 1 Incoming1 (1-lot) trades with TON 1 (1-lot) at 860.75;

TON 7-Stop (86075) is triggered by Trade 1;

Trade 2 TON 1 (9-lot) trades with TON 7 (9-lot) at 860.75;

Trade 3 TON 2 (1-lot) trades with TON 7 (1-lot) at 860.00;

TON 8-Stop (86000) is triggered by Trade 3;

Trade 4 TON 2 (4-lot) trades with TON 8 (4-lot) at 860.00;

Trade 5 TON 3 (1-lot) trades with TON 8 (1-lot) at 859.00;

TON 9-Stop (85900) is triggered by Trade 5;

Trade 6 TON 3 (4-lot) trades with TON 9 (4-lot) at 859.00;

Trade 7 TON 4 (1-lot) trades with TON 9 (1-lot) at 858.75;

TON 10-Stop (85875) is triggered by Trade 7;

Trade 7 TON 4 (4-lot) trades with TON 10 (4-lot) at 858.75;

Trade 8 TON 5 (1-lot) trades with TON 10 (1-lot) at 855.00; and

TON 11-Stop (85500) is triggered by Trade 8.

The market is placed in a reserved state because the trade that would occur at a price of 854.50 would violate the no bust range. The no bust range for ES is currently six. Since the stop iteration began with a trade price of 860.75, the market will not trade past a price of 854.75. The order book will display the following in a reserved state:

| | | ESM3 | | | |
|---|---|---|---|---|---|
| TON | QTY | BID | ASK | QTY | TON |
| TON 6 | 10 | 85450 | 85450 | 5 | TON 11 |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place:

Trade 9 TON 6 (5-lot) trades with TON 11 (5-lot) at 854.50.

| | ESM3 | | |
|---|---|---|---|
| QTY | BID | ASK | QTY |
| 5 | 88450 | | |

In a fifth example, a manual intervention occurs. Like the other examples, the price verification time is programmed to about a five second interval.

In this example, a sell order enters the market for a quantity of 1 at 874.00. The minimum price that can be traded for this trading iteration is 868.00. The ESM3 market should be reserved when violating the no bust range at 868.00. However, due to a manual intervention, the five-second iteration variable is overridden. The instrument will re-open by a manually initiating of an opening command.

| | | ESM3 | | | | |
|---|---|---|---|---|---|---|
| TON | QTY | BID | ASK | QTY | | TON |
| TON 1 | 10 | 87400 | 87325 | 10 | Stop (87400) | TON 7 |
| TON 2 | 5 | 87350 | 87300 | 5 | Stop (87350) | TON 8 |
| TON 3 | 5 | 87300 | 87250 | 5 | Stop (87300) | TON 9 |
| TON 4 | 5 | 87250 | 86800 | 5 | Stop (87250) | TON 10 |
| TON 5 | 1 | 87250 | 86750 | 5 | Stop (87250) | TON 11 |
| TON 6 | 10 | 86750 | 86750 | 10 | Stop (87250) | TON 12 |
| | | | 87400 | 1 | | Incoming1 |

With the market in a continuous trading state, the following sequence occurs if Incoming1—Sell of 1 @ 874.00 enters the market.

Trade 1 Incoming1 (1-lot) trades with TON 1 (1-lot) at 874.00;
TON 7-Stop (87400) is triggered by Trade 1;
Trade 2 TON 1 (9-lot) trades with TON 7 (9-lot) at 874.00;
Trade 3 TON 2 (1-lot) trades with TON 7 (1-lot) at 873.50;
TON 8-Stop (873.50) is triggered by Trade 3;
Trade 4 TON 2 (4-lot) trades with TON 8 (4-lot) at 873.50;
Trade 5 TON 3 (1-lot) trades with TON 8 (1-lot) at 873.00;
TON 9-Stop (87300) is triggered by Trade 5;
Trade 6 TON 3 (4-lot) trades with TON 9 (4-lot) at 873.00;
Trade 7 TON 4 (1-lot) trades with TON 9 (1-lot) at 872.50;
TON 10-Stop (872.50), TON 11-Stop (872.50), and TON 12-Stop (872.50) are triggered by Trade 7;
Trade 8 TON 4 (4-lot) trades with TON 10 (4-lot) at 872.50; and
Trade 9 TON 5 (1-lot) trades with TON 10 (1-lot) at 872.50.

The market is placed in a reserved state because the trade that would occur at a price of 867.50 would violate the no bust range. The no bust range for ES is currently six. Since the stop iteration began with a trade price of 874.00, the market will not trade past a price of 868.00. The order book will display the following in a reserved state:

| | | ESM3 | | | |
|---|---|---|---|---|---|
| TON | QTY | BID | ASK | QTY | TON |
| TON 6 | 10 | 86750 | 86750 | 5 | TON 11 |
| | | | 86750 | 10 | TON 12 |

Due to a manual intervention, the instrument will not re-open until an Exchange administrator performs an alternate manual intervention to re-open the market.

In a sixth example, a price comparison to a multiple of the no-bust range occurs. When a sell order enters the market for a quantity of 1 at 865.75, a cascade of stop orders are triggered. The minimum price that may be traded for the first trading iteration is 859.75 (1×) and the minimum price that may be traded for the second iteration is 853.75 (2×). The ESM3 market will be reserved at 859.75 (one iteration) and 853.75 (two iterations).

| | | ESM3 | | | | |
|---|---|---|---|---|---|---|
| TON | QTY | BID | ASK | QTY | | TON |
| TON 1 | 10 | 86575 | 86550 | 10 | Stop (86575) | TON 8 |
| TON 2 | 5 | 86550 | 86450 | 5 | Stop (86550) | TON 9 |
| TON 3 | 5 | 86500 | 86200 | 5 | Stop (86500) | TON 10 |
| TON 4 | 5 | 86450 | 86250 | 5 | Stop (86450) | TON 11 |
| TON 5 | 1 | 86250 | 86150 | 5 | Stop (86250) | TON 12 |
| TON 6 | 10 | 86200 | 85300 | 10 | Stop (86200) | TON 13 |
| TON 7 | 5 | 85300 | | | | |
| | | | 86575 | 1 | | Incoming1 |

With the market in a continuous trading state, the following sequence occurs if Incoming1—Sell of 1 (865.75 enters market:

Trade 1 Incoming1 (1-lot) trades with TON 1 (1-lot) at 865.75;
TON 8-Stop (86575) is triggered by Trade 1;
Trade 2 TON 1 (9-lot) trades with TON 8 (9-lot) at 865.75;
Trade 3 TON 2 (1-lot) trades with TON 8 (1-lot) at 865.50;
TON 9-Stop (86550) is triggered by Trade 3;
Trade 4 TON 2 (4-lot) trades with TON 9 (4-lot) at 865.50;
Trade 5 TON 3 (1-lot) trades with TON 9 (1-lot) at 865.00;
TON 10 Stop (86500) is triggered by Trade 5;
Trade 6 TON 3 (4-lot) trades with TON 10 (4-lot) at 865.00;
Trade 7 TON 4 (1-lot) trades with TON 10 (1-lot) at 864.50;
TON 11-Stop (86450) is triggered by Trade 7;
Trade 8 TON 4 (4-lot) trades with TON 11 (4-lot) at 864.50;
Trade 9 TON 5 (1-lot) trades with TON 11 (1-lot) at 862.50;
TON 12-Stop (86250) is triggered by Trade 9;
Trade 10 TON 6 (5-lot) trades with TON 12 (5-lot) at 862.00;
TON 13-Stop (86200) is triggered by Trade 10; and
Trade 11 TON 6 (5-lot) trades with TON 13 (5-lot) at 862.00.

The market is placed in a reserved state because the trade that would occur at a price of 853.00 would violate the no bust range. The no bust range for ES is currently six. Since the stop iteration began with a trade price of 865.75, the market will not trade past a price of 859.75 (1×) and 853.75 (2×). The order book will display the following in a reserved state:

| | | ESM3 | | | |
|---|---|---|---|---|---|
| TON | QTY | BID | ASK | QTY | TON |
| TON 7 | 5 | 85300 | 85300 | 5 | TON 13 |

After waiting a predetermined length of time, if the indicative opening price (853.00) is greater than twice the no bust range (12.00 from the original last price), the market will remain in a reserved state for a second time iteration. In this example, the market will repeat a second iteration in a reserve state. After the second iteration, the market will again validate the indicative opening price and the market will re-open because the indicative opening price (853.00) is within the new price range.

Trade 12 TON 7 (5-lot) trades with TON 13 (5-lot) at 853.00.

In a seventh example, an instrument is scheduled to close before the expiration of the stop price validation variable. If the instrument is currently in a reserve state due to a no bust range violation, the instrument will proceed to a closed state. The following sequence illustrates this example:

Price logic is violated due to the triggering of a stop order violating the no bust range.

The market is placed in a reserved state for an initial iteration of a predetermined time.

While the timer is measuring the timing interval, a group controller closes the instrument.

The stop price validation parameter is reset due to an override by the group controller.

In an eighth example, an imbalance condition occurs during execution of a single conditional order. The minimum price that can be traded for this trading iteration is 854.00.

| | | ESM3 | | | |
|---|---|---|---|---|---|
| TON | QTY | BID | ASK | QTY | TON |
| TON 1 | 1 | 86000 | 85300 | 6 | Stop (86000) TON 6 |
| TON 2 | 1 | 85900 | | | |
| TON 3 | 1 | 85800 | | | |
| TON 4 | 2 | 85400 | | | |
| TON 5 | 1 | 85300 | | | |
| | | | 86000 | 1 | Incoming1 |

With the market in a continuous trading state, the following sequence occurs if Incoming1—Sell of 1 @ 860.00 enters the market:

Trade 1 Incoming1 (1-lot) trades with TON 1 (1-lot) at 860.00;

TON 6-Stop (86000) is triggered by Trade 1;

Trade 2 TON 2 (1-lot) trades with TON 6 (1-lot) at 859.00;

Trade 3 TON 3 (1-lot) trades with TON 6 (1-lot) at 858.00; and

Trade 4 TON 4 (2-lot) trades with TON 6 (2-lot) at 854.00.

The market is placed in a reserved state because the trade that would occur at a price of 853.00 would violate the no bust range. The no bust range for ES is currently six. Since the stop iteration began with a trade price of 860.00, the market will not trade past a price of 854.00. The order book will display the following in a reserved state:

| | | ESM3 | | | |
|---|---|---|---|---|---|
| TON | QTY | BID | ASK | QTY | TON |
| TON 5 | 1 | 85300 | 85300 | 2 | TON 6 |

After waiting a predetermined length of time, if the indicative opening price is greater than twice the no bust range (12.00 from the original last price), the market will remain in a reserved state for a second time iteration. In this example, the market will be allowed to open at the end of the five second delay and the following trade will take place:

Trade 5 TON 5 (1-lot) trades with TON 6 (2-lot) at 853.00.

| | ESM3 | | |
|---|---|---|---|
| QTY | BID | ASK | QTY |
| | | 853.00 | 1 |

In a ninth example, the market is in a reserved state. Additional orders are entered which alter the indicative opening price and allow the market to open. If the new limit orders were not entered, the market would have remained reserved due to violation of the no bust limit.

| | | ESM3 | | | |
|---|---|---|---|---|---|
| TON | QTY | BID | ASK | QTY | TON |
| TON 21 | Stop (85400) | 5 | 85525 | 85400 | 1 | TON 1 |
| TON 20 | Stop (85525) | 5 | 85625 | 85525 | 5 | TON 2 |
| TON 19 | Stop (85625) | 5 | 85775 | 85625 | 5 | TON 3 |
| TON 18 | Stop (85775) | 5 | 85950 | 85775 | 5 | TON 4 |
| TON 17 | Stop (85950) | 5 | 86025 | 85950 | 5 | TON 5 |
| TON 16 | Stop (86025) | 5 | 86350 | 86025 | 5 | TON 6 |
| TON 10 | Stop (86550) | 5 | 86600 | 86600 | 5 | TON 7 |
| TON 9 | Stop (86550) | 5 | 86650 | 86650 | 5 | TON 8 |
| Incoming1 | | | 1 | 854.00 | | |

With the market in a continuous trading state, the following sequence occurs if Incoming1—Buy of 1 (854.00 enters the market:

Trade 1 Incoming1 (1-lot) trades with TON 1 (1-lot) at 854.00;

TON 21-Stop (85400) is triggered by Trade 1;

Trade 2 TON 21 (5-lot) trades with TON 2 (5-lot) at 855.25;

TON 20-Stop (85525) is triggered by Trade 2;

Trade 3 TON 20 (5-lot) trades with TON 3 (5-lot) at 856.25;

TON 19-Stop (85625) is triggered by Trade 3;

Trade 4 TON 19 (5-lot) trades with TON 4 (5-lot) at 857.75;

TON 18-Stop (85775) is triggered by Trade 4;

Trade 5 TON 18 (5-lot) trades with TON 5 (5-lot) at 859.50; and

TON 17-Stop (85950) is triggered by Trade 5.

The market is placed in a reserved state because the trade that would occur at a price of 860.25 would violate the no bust range. The no bust range for ES is currently six. Since the stop iteration began with a trade price of 854.00, the market will not trade past a price of 860.00. The order book will display the following in a reserved state:

| | | ESM3 | | | |
|---|---|---|---|---|---|
| TON | | QTY | BID | ASK | QTY | TON |
| TON 17 | | 5 | 86025 | 86025 | 5 | TON 6 |
| Incoming3 | | 5 | 86650 | 86550 | 5 | Incoming4 |
| Incoming2 | | 5 | 86650 | 86550 | 5 | Incoming3 |
| TON 10 | Stop (86650) | 5 | 86600 | 86600 | 5 | TON 7 |
| TON 9 | Stop (86650) | 5 | 86650 | 86650 | 5 | TON 8 |

As shown, during the reserve state, new orders were received. Due to the incoming orders, the indicative opening price is now 866.00. After waiting a predetermined length of time, if the indicative opening price (866.00) is greater than twice the no bust range (12.00 from the original last price), the market will remain in a reserved state for a second iteration. In this example, the market will be allowed to re-open because the indicative opening price (866.00) is within the new range (866.00).

TON 10-Stop (86650) and TON 9-Stop (86650) is triggered by the indicative opening price;

Trade 6 TON 10 (5-lot) trades with Inc 4 (5-lot) at 866.00;

Trade 7 TON 9 (5-lot) trades with Inc 5 (5-lot) at 866.00;

Trade 8 Inc 3 (5-lot) trades with TON 7 (5-lot) at 866.00; and

Trade 9 Inc 2 (5-lot) trades with TON 6 (5-lot) at 866.00.

| ESM3 | | | |
|---|---|---|---|
| QTY | BID | ASK | QTY |
| 5 | 86025 | 86650 | 5 |

In an tenth example, the market is reserved. The indicative opening price is a better bid that violates the no bust range and the market remains reserved.

| | | ESM3 | | | |
|---|---|---|---|---|---|
| TON | QTY | BID | ASK | QTY | TON |
| TON 11 | Stop (85400) | 5 | 85525 | 85400 | 1 | TON 1 |
| TON 10 | Stop (85525) | 5 | 85625 | 85525 | 5 | TON 2 |
| TON 9 | Stop (85625) | 5 | 85775 | 85625 | 5 | TON 3 |
| TON 8 | Stop (85775) | 5 | 85950 | 85775 | 5 | TON 4 |
| TON 7 | Stop (85950) | 5 | 86625 | 85950 | 5 | TON 5 |
| | | | | 86625 | 5 | TON 6 |
| Incoming1 | | 1 | 854.00 | | |

With the market in a continuous trading state, the following sequence occurs if Incoming1—Buy of 1 @ 854.00 enters the market:
  Trade 1 Incoming1 (1-lot) trades with TON 1 (1-lot) at 854.00;
  TON 11-Stop (85400) is triggered by Trade 1;
  Trade 2 TON 11 (5-lot) trades with TON 2 (5-lot) at 855.25;
  TON 10-Stop (85525) is triggered by Trade 2;
  Trade 3 TON 10 (5-lot) trades with TON 3 (5-lot) at 856.25;
  TON 9-Stop (85625) is triggered by Trade 3;
  Trade 4 TON 9 (5-lot) trades with TON 4 (5-lot) at 857.75;
  TON 8-Stop (85775) is triggered by Trade 4;
  Trade 5 TON 8 (5-lot) trades with TON 5 (5-lot) at 859.50; and
  TON 7-Stop (85950) is triggered by Trade 5.

The market is placed in a reserved state because the trade that would occur at a price of 866.25 would violate the no bust range. The no bust range for ES is currently six. Since the stop iteration began with a trade price of 854.00, the market will not trade past a price of 860.00. The order book will display the following in a reserved state:

| | | ESM3 | | | |
|---|---|---|---|---|---|
| TON | QTY | BID | ASK | QTY | TON |
| TON 7 | 5 | 86625 | 86625 | 5 | TON 6 |

During the reserved state, the remaining offer is cancelled (TON 6) and a new order is entered at a price of 867.00. The indicative opening price is currently an 867.00B (better bid).

| | | ESM3 | | | |
|---|---|---|---|---|---|
| TON | QTY | BID | ASK | QTY | TON |
| TON 8 | 5 | 86700 | | | |
| TON 7 | 5 | 86625 | | | |

After waiting a predetermined length of time, the indicative opening price (867.00B) is outside the no bust range of 866.00 (2×6.00) and the market will remain in reserved state for a second iteration. After the second iteration is exhausted, the indicative opening price lies within the no bust range and the market opens.

In an eleventh example, the market is reserved. Upon validation of an indicative opening price (an indicative opening price that is a better offer (A)), the market remains reserved because the indicative opening price violates the no bust range.

| | | ESM3 | | | |
|---|---|---|---|---|---|
| TON | QTY | BID | ASK | QTY | TON |
| TON 1 | 1 | 86525 | 86450 | 5 | Stop (86525) TON 7 |
| TON 2 | 5 | 86450 | 86400 | 5 | Stop (86450) TON 8 |
| TON 3 | 5 | 86400 | 86300 | 5 | Stop (86400) TON 9 |
| TON 4 | 5 | 86300 | 85300 | 5 | Stop (86300) TON 10 |
| TON 5 | 5 | 85300 | | | |
| | | | 86525 | 1 | Incoming1 |

With the market in a continuous trading state, the following sequence occurs if Incoming1—Sell of 1 @ 865.25 enters the market:
  Trade 1 Incoming1 (1-lot) trades with TON 1 (1-lot) at 865.25;
  TON 7-Stop (86525) is triggered by Trade 1;
  Trade 2 TON 2 (5-lot) trades with TON 7 (5-lot) at 864.50;
  TON 8-Stop (86450) is triggered by Trade 2;
  Trade 3 TON 3 (5-lot) trades with TON 8 (5-lot) at 864.00;
  TON 9-Stop (86400) is triggered by Trade 3;
  Trade 4 TON 4 (5-lot) trades with TON 9 (5-lot) at 863.00; and
  TON 10-Stop (86300) is triggered by Trade 4.

The market is placed in a reserved state because the trade that would occur at a price of 853.00 would violate the no bust range. The no bust range for ES is currently six. Since the stop iteration began with a trade price of 865.25, the market will not trade past a price of 859.25. The order book will display the following in a reserved state:

| | | ESM3 | | | |
|---|---|---|---|---|---|
| TON | QTY | BID | ASK | QTY | TON |
| TON 5 | 5 | 85300 | 85300 | 5 | TON 10 |

During the reserved state, the remaining bid is cancelled (TON 5) and a better offer enters the market. The indicative opening price is currently an 852.00A (better offer).

| | | ESM3 | | | |
|---|---|---|---|---|---|
| TON | QTY | BID | ASK | QTY | TON |
| | | | 85300 | 5 | TON 10 |
| | | | 85200 | 5 | TON 11 |

After waiting a predetermined length of time, the indicative opening price (852.00) is outside the no bust range of 853.25 (2×6.00) and the market will remain in reserved state for a second iteration. After the second iteration is exhausted, the indicative opening price will lie inside the no bust range and the market opens.

In the twelfth example, the market is reserved. Upon validation of an indicative opening price, (an indicative opening price that is a better bid (B)) the market opens because the indicative opening price no longer violates the no bust range.

| | | ESM3 | | | |
|---|---|---|---|---|---|
| TON | QTY | BID | ASK | QTY | TON |
| TON 11 | Stop (85400) | 5 | 85525 | 85400 | 1 | TON 1 |
| TON 10 | Stop (85525) | 5 | 85625 | 85525 | 5 | TON 2 |
| TON 9 | Stop (85625) | 5 | 85775 | 85625 | 5 | TON 3 |
| TON 8 | Stop (85775) | 5 | 85950 | 85775 | 5 | TON 4 |
| TON 7 | Stop (85950) | 5 | 86025 | 85950 | 5 | TON 5 |
| | | | | 86025 | 5 | TON 6 |
| Incoming1 | | | 1 | 854.00 | | |

With the market in a continuous trading state, the following sequence occurs if Incoming1—Buy of 1 (854.00 enters the market:

Trade 1 Incoming1 (1-lot) trades with TON 1 (1-lot) at 854.00;

TON 11-Stop (85400) is triggered by Trade 1;

Trade 2 TON 11 (5-lot) trades with TON 2 (5-lot) at 855.25;

TON 10-Stop (85525) is triggered by Trade 2;

Trade 3 TON 10 (5-lot) trades with TON 3 (5-lot) at 856.25;

TON 9-Stop (85625) is triggered by Trade 3;

Trade 4 TON 9 (5-lot) trades with TON 4 (5-lot) at 857.75;

TON 8-Stop (85775) is triggered by Trade 4;

Trade 5 TON 8 (5-lot) trades with TON 5 (5-lot) at 859.50; and

TON 7-Stop (85950) is triggered by Trade 5.

The market is placed in a reserved state because the trade that would occur at a price of 860.25 would violate the no bust range. The no bust range for ES is currently six. Since the stop iteration began with a trade price of 854.00, the market will not trade past a price of 860.00. The order book will display the following in a reserved state:

| | | ESM3 | | | |
|---|---|---|---|---|---|
| TON | QTY | BID | ASK | QTY | TON |
| TON 7 | 5 | 86025 | 86025 | 5 | TON 6 |

During the reserved state, the remaining offer is cancelled (TON 6). After waiting a preset length of time, the indicative opening price will be the bid price (860.25) which is no longer in violation of the no bust range (866.00) and the market opens.

In a thirteenth example, the market is reserved. Upon a validation of the indicative opening price (an indicative opening price that is a better offer (A) that no longer violates the no bust range) the market opens.

| | | ESM3 | | | |
|---|---|---|---|---|---|
| TON | QTY | BID | ASK | QTY | TON |
| TON 1 | 1 | 86525 | 86450 | 5 | Stop (86525) TON 7 |
| TON 2 | 5 | 86450 | 86400 | 5 | Stop (86450) TON 8 |
| TON 3 | 5 | 86400 | 86300 | 5 | Stop (86400) TON 9 |
| TON 4 | 5 | 86300 | 85900 | 5 | Stop (86300) TON 10 |
| TON 5 | 5 | 85900 | | | |
| | | | 86525 | 1 | Incoming1 |

With the market in a continuous trading state, the following sequence occurs if Incoming1—Sell of 1 @ 865.25 enters the market:

Trade 1 Incoming1 (1-lot) trades with TON 1 (1-lot) at 865.25;

TON 7-Stop (86525) is triggered by Trade 1;

Trade 2 TON 2 (5-lot) trades with TON 7 (5-lot) at 864.50;

TON 8-Stop (86450) is triggered by Trade 2;

Trade 3 TON 3 (5-lot) trades with TON 8 (5-lot) at 864.00;

TON 9-Stop (86400) is triggered by Trade 3;

Trade 4 TON 4 (5-lot) trades with TON 9 (5-lot) at 863.00; and

TON 10-Stop (86300) is triggered by Trade 4.

The market is placed in a reserved state because the trade that would occur at a price of 859.00 would violate the no bust range. The no bust range for ES is currently six. Since the stop iteration began with a trade price of 865.25, the market will not trade past a price of 859.25. The order book will display the following in a reserved state:

| | | ESM3 | | | |
|---|---|---|---|---|---|
| TON | QTY | BID | ASK | QTY | TON |
| TON 5 | 5 | 85900 | 85900 | 5 | TON 10 |

During the reserved state, the remaining bid is cancelled (TON 5). After waiting a preset length of time, the indicative opening price is the offer price (859.00) which is no longer in violation of the no bust range (853.25) and the market opens.

When a buy order enters the market for a quantity of 1 at 861.00, a cascade of stop orders is triggered in a fourteenth example.

| | | ESM3 | | | |
|---|---|---|---|---|---|
| TON | | QTY | BID | ASK | QTY | TON |
| TON 6 | Stop (86100) | 5 | 86250 | 86100 | 1 | TON 1 |
| TON 7 | Stop (86250) | 5 | 86350 | 86250 | 5 | TON 2 |
| TON 8 | Stop (86350) | 5 | 86450 | 86350 | 5 | TON 3 |
| TON 9 | Stop (86450) | 5 | 86850 | 86450 | 5 | TON 4 |
| TON 10 | Stop (86450) | 5 | 86875 | 86800 | 5 | TON 5 |
| TON 11 | Stop (86450) | 10 | 86900 | | | |
| Incoming1 | TON 12 | | 1 | 86100 | | |

With the market in a continuous trading state, the following sequence occurs if Incoming1—Buy of 1 @ 873.75 enters the market:

Trade 1 Incoming 1, TON 12 (1-lot) trades with TON 1 (1-lot) at 86100;

TON 6-Stop (86100) is triggered by Trade 1;

Trade 2 TON 2 (5-lot) trades with TON 6 (5-lot) at 862.50;

TON 7-Stop (86250) is triggered by Trade 2;

Trade 3 TON 3 (5-lot) trades with TON 7 (5-lot) at 863.50;

TON 8-Stop (86350) is triggered by Trade 3;

Trade 4 TON 4 (5-lot) trades with TON 8 (5-lot) at 864.50; and

TON 9-Stop (86450), TON 10 (86450) and TON 11 (86450) are triggered by Trade 4.

The market is placed into a reserved state because the trade that would occur at a price of 868.50 would violate the no bust range. The no bust range for ES is currently six. Since iteration began with a trade price of 861.00, the market will not trade past a price of 867.00. The order book will display the following in a reserved state:

| | | ESM3 | | | |
|---|---|---|---|---|---|
| TON | | QTY | BID | ASK | QTY | TON |
| INCOMING 2 | indicative opening price | 10 | 86875 | 86875 | 12 | TON 5 |
| TON 9 | | | | 86850 | 5 | |
| TON 10 | | | | 86875 | 5 | |
| TON 11 | | | | 86900 | 5 | |

During the first iteration, a second incoming order is entered which generates a bias on the bid side of the market. The indicative opening price generated after the second incoming order enters a 10-lot on the bid side and a 12-lot on the offer side at a price of 868.75. After waiting a predetermined length of time, if the indicative opening price is greater than twice the no bust range (12.00 from the original last price), the market will remain in a reserved state for a second time iteration. In this example, the market opens at the end of a five second delay because the indicative opening price (868.75) is not outside the no bust range (873.00). The following trades then take place:
  Trade 7 TON 10 (5-lot) trades with TON 5 (5-lot) at 868.75;
  Trade 8 TON 11 (5-lot) trades with TON 5 (5-lot) at 868.75; and
  Trade 9 Incomming2 (2-lot) trades with TON 5 (2-lot at 868.75).

| | ESM3 | | |
|---|---|---|---|
| QTY | BID | ASK | QTY |
| 8 | 868.75 | | |
| 5 | 868.50 | | |

When a sell order enters the market for a quantity of 1 at 861.00, a cascade of stop orders is triggered in a fifteenth example. The minimum price that can be traded in this trading iteration is 859.25.

| | | ESM3 | | | |
|---|---|---|---|---|---|
| TON | QTY | BID | ASK | QTY | | TON |
| TON 1 | 1 | 865.25 | 864.50 | 5 | Stop (865.25) | TON 6 |
| TON 2 | 5 | 864.50 | 864.00 | 5 | Stop (864.50) | TON 7 |
| TON 3 | 5 | 864.00 | 863.00 | 5 | Stop (864.00) | TON 8 |
| TON 4 | 5 | 863.00 | 859.00 | 5 | Stop (863.00) | TON 9 |
| TON 5 | 12 | 859.00 | 858.50 | 5 | Stop (863.00) | TON 10 |
| | | | 858.00 | 5 | Stop (863.00) | TON 11 |
| | | | Incoming1 | 1 | 865.25 | TON 12 |

With the market in a continuous trading state, the following sequence occurs if Incoming1—Buy of 1 (873.75 enters the market:
  Trade 1 Incoming1, TON 12 (1-lot) trades with TON 1 (1-lot) at 865.25;
  TON 6 (865.25) is triggered by Trade 1;
  Trade 2 TON 2 (5-lot) trades with TON 6 (5-lot) at 864.50;
  TON 7 (864.50) 864.00 is triggered by Trade 2;
  Trade 3 TON 3 (5-lot) trades with TON 7 (5-lot) at 864.00;
  TON 8 (86350) is triggered by Trade 3;
  Trade 4 TON 4 (5-lot) trades with TON 8 (5-lot) at 863.00; and
  TON 9 (86300), TON 10 (86300) and TON 11 (86300) are triggered by Trade 4.

The market is placed into a reserved state because the trade that would occur at a price of 859.00 would violate the no bust range. The no bust range for ES is currently six. Since the stop iteration began with a trade price of 865.25, the market will not trade past a price of 859.25. The order book will display the following in a reserved state:

| | | ESM3 | | | |
|---|---|---|---|---|---|
| TON | QTY | BID | ASK | QTY | TON |
| TON 5 | 12 | 859.00 | 859.00 | 5 | TON 9 |
| | | | 858.75 | 10 | Incoming2 |
| | | | 858.50 | 5 | TON 10 |
| | | | 858.00 | 5 | TON 11 |

During the first iteration a second incoming order entered generates a bias on the sell side of the market. The indicative opening price generated after the second incoming order enters a 12-lot on the bid side and 10-lot on the offer side with an indicative opening price of 858.75. After waiting a predetermined length of time, if the indicative opening price is greater than twice the no bust range (12.00 from the original last price), the market will remain in a reserved state for a second time iteration. In this example, the market will open at the end of a five second delay because the indicative opening price (858.75) is not outside the no bust range (853.25).
  Trade 7 TON 10 (5-lot) trades with TON 5 (5-lot) at 858.75;
  Trade 8 TON 11 (5-lot) trades with TON 5 (5-lot) at 858.75; and
  Trade 9 Incoming2 (2-lot) trades with TON 5 (2-lot) at 858.75.

While some embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

What is claimed is:

1. A computer system that mitigates the effects of rises or falls in market prices of a product caused by conditional execution of an order for the product, the computer system comprising: a processor and a memory coupled therewith, the processor being configured to cause the system to receive orders for the product during a trading session, compare an execution price of a conditional order for the product to a price threshold range, discontinue matching of received orders for the product when an execution price of the conditional order lies outside of the price threshold range, compare a derived indicative opening price to the price threshold range, wherein the derived indicative opening price is derived in real-time using orders for the product received subsequent to the discontinuation of the matching of orders for the product, compare the indicative opening price to the price threshold range, modify the price threshold range when the comparison indicates that the indicative opening price is outside the price threshold range, and resume the matching of orders for the product when the derived indicative opening price lies within the modified price threshold range.

2. The system of claim 1 wherein the execution price of the conditional order comprises a price range within which the conditional order is satisfied and a trade is executed.

3. The system of claim 1 wherein the price threshold range comprises a no-bust range.

4. The system of claim 2 wherein the memory is configured to use a time parameter to determine a maximum period of time that a matching of orders may be delayed.

5. The system of claim 1 further comprising a matching system coupled to the processor.

6. The system of claim 1 wherein the processor further compares an execution price of the conditional order to a price threshold range in real-time.

7. A non-transitory computer readable medium storing instructions which when executed by a programmed processor, cause the programmed processor to perform a method comprising:
- monitoring orders for a product submitted to a trading engine in an automated matching system during a trading session for the product;
- comparing the price of a conditional order for the product to a price range;
- discontinuing matching of orders for the product submitted to the trading engine when an execution price of the conditional order lies outside of the price range;
- deriving an indicative opening price to be used by the trading engine, wherein the indicative opening price is derived in real-time from orders for the product received while the matching of orders is discontinued;
- comparing the indicative opening price to the price range;
- modifying the price range to a second price range when the comparison indicates that the indicative opening price is outside the price range; and
- resuming the matching of the orders when the indicative opening price lies within the second price range such that an effect of a market spike caused by triggering and election of the conditional order is mitigated.

8. The non-transitory computer readable medium of claim 7 wherein the discontinuing the matching of orders further comprises discontinuing the matching of orders until the opening price lies within the second price range up to a maximum time period.

9. A non-transitory computer readable medium storing instructions which when executed by a programmed processor perform a method for mitigating the effect of a market spike caused by the triggering and the election of a conditional order for a product, the computer readable medium comprising:
- an evaluation logic stored on the non-transitory computer readable medium and executable by the programmed processor to monitor orders for the product submitted to a trading engine in an automated matching system during a trading session for the product, the evaluation logic being configured to compare an execution price of the conditional order to a price range;
- a discontinue logic stored on the non-transitory computer readable medium and executable by the programmed processor to discontinue matching of the orders for the product submitted to the trading engine when the execution price of the conditional order lies outside of the price range by establishing a reserved state for the submitted orders for the product;
- a pricing logic stored on the non-transitory computer readable medium and executable by the programmed processor to derive an indicative opening price to be used by the trading engine, wherein the indicative opening price is derived in real-time from orders for the product requested while the matching of the orders for the product is discontinued, and wherein the pricing logic is further executable by the programmed processor to compare the indicative opening price to the price range and modify the price range when the comparison indicates that the indicative opening price is outside the price range; and
- a timing logic stored on the non-transitory computer readable medium and executable by the programmed processor for measuring a time while the matching of the orders for the product is discontinued up to a maximum delay time set by a control center, wherein the reserved state is removed and the matching of orders for the product is resumed when the indicative opening price is within the modified price range prior to the expiration of the maximum delay time.

10. A non-transitory computer readable medium storing instructions which when executed by a programmed processor cause the programmed processor to perform the following:
- monitoring orders for a product submitted to a trading engine in an automated matching system during a trading session for the product;
- comparing the price of a stop order for the product to a price range;
- discontinuing the matching of orders for the product submitted to the trading engine when an execution price of the stop order lies outside of the price range;
- deriving an indicative opening price to be used by the trading engine, wherein the indicative opening price is derived in real-time from orders for the product requested during the discontinuing the matching of orders,
- comparing the indicative opening price to the price range, and
- modifying the price range when the comparison indicates that the indicative opening price is outside the price range,
- wherein the discontinuing the matching of the orders for the product is performed until the indicative opening price lies within the modified price range up to a maximum delay time set by a control center.

* * * * *